US012671588B1

(12) United States Patent
Lee

(10) Patent No.: US 12,671,588 B1
(45) Date of Patent: Jun. 30, 2026

(54) IDENTITY-BOUND DELEGATED AUTHORIZATION, CONNECTOR MEDIATION, AND OFFLINE-VERIFIABLE RECEIPT LINEAGE FOR AGENTIC SYSTEMS

(71) Applicant: Yong Bok Lee, Sheridan, WY (US)

(72) Inventor: Yong Bok Lee, Sheridan, WY (US)

(73) Assignee: THE CROWN AND THE CROSS LLC, Sheridan, WY (US)

( * ) Notice: Subject to any disclaimer, the term of this patent is extended or adjusted under 35 U.S.C. 154(b) by 0 days.

(21) Appl. No.: 19/554,930

(22) Filed: Mar. 3, 2026

(51) Int. Cl.
*H04L 9/32* (2006.01)
*H04L 9/40* (2022.01)

(52) U.S. Cl.
CPC .......... *H04L 9/3213* (2013.01); *H04L 9/3218* (2013.01); *H04L 9/3247* (2013.01); *H04L 9/40* (2022.05)

(58) Field of Classification Search
CPC ....... H04L 9/3213; H04L 9/40; H04L 9/3218; H04L 9/3247
See application file for complete search history.

(56) References Cited

U.S. PATENT DOCUMENTS

| | | | |
|---|---|---|---|
| 6,308,274 B1 | 10/2001 | Swift | |
| 7,490,333 B2 | 2/2009 | Grimaud et al. | |
| 8,832,452 B2 | 9/2014 | Johnson et al. | |
| 8,875,266 B2 | 10/2014 | Chambers et al. | |

| | | | |
|---|---|---|---|
| 9,137,023 B1 | 9/2015 | Hackborn et al. | |
| 9,635,000 B1 | 4/2017 | Muftic | |
| 10,146,825 B2 | 12/2018 | Almgren | |
| 10,628,268 B1 | 4/2020 | Baruch et al. | |
| 11,210,143 B1 * | 12/2021 | Dubey ................. | G06F 9/4881 |
| 11,245,682 B2 | 2/2022 | Kukreja et al. | |
| 11,546,377 B2 | 1/2023 | Boshmaf et al. | |

(Continued)

OTHER PUBLICATIONS

"Macaroons: Cookies with Contextual Caveats for Decentralized Authorization in the Cloud"—Birgisson et al.—NDSS 2014—Feb. 22, 2014.

(Continued)

*Primary Examiner* — Oleg Korsak

(57) ABSTRACT

Systems and methods provide an integrated technical control architecture for agentic systems, including large language model (LLM)-based agents, tool-calling assistants, and workflow orchestrators, in which delegated authority, connector invocation, and verification evidence share a common cryptographic lineage. An agent authority rail verifies an identity credential bound to an agent-held key, canonicalizes selected request fields, computes a request digest, derives a least-privilege capability scope with temporal constraints, and issues a capability token cryptographically bound to the verified identity credential, the request digest, the capability scope, and the temporal constraints. A connector trust mediation system verifies a connector descriptor, derives an invocation scope, isolates tool output from privileged instruction channels via a context firewall, and emits linked receipts. An append-only transparency log returns proofs and checkpoints. An offline verifier reconstructs lineage and validates proofs, witness requirements, and verification profiles without online access to a receipt producer.

23 Claims, 13 Drawing Sheets

SYSTEM OVERVIEW (100)

(56) References Cited

U.S. PATENT DOCUMENTS

| | | | | |
|---|---|---|---|---|
| 12,003,655 | B1 | 6/2024 | Slaughter et al. | |
| 12,299,114 | B2 | 5/2025 | Kalle et al. | |
| 12,541,532 | B1* | 2/2026 | Stolze | G06F 16/27 |
| 2017/0075938 | A1 | 3/2017 | Black et al. | |
| 2017/0346639 | A1 | 11/2017 | Muftic | |
| 2018/0005186 | A1 | 1/2018 | Hunn et al. | |
| 2018/0241572 | A1 | 8/2018 | Miele et al. | |
| 2020/0159966 | A1 | 5/2020 | Sibert et al. | |
| 2020/0259663 | A1 | 8/2020 | Firsov | |
| 2021/0018953 | A1 | 1/2021 | Ford | |
| 2023/0179435 | A1* | 6/2023 | Heinecke | H04L 9/50 |
| | | | | 380/28 |
| 2025/0258937 | A1* | 8/2025 | Crabtree | G06N 5/02 |
| 2025/0258956 | A1* | 8/2025 | Crabtree | G06F 21/6245 |
| 2025/0259084 | A1* | 8/2025 | Crabtree | G06F 21/6245 |
| 2025/0259711 | A1* | 8/2025 | Crabtree | G16B 50/00 |
| 2026/0024090 | A1* | 1/2026 | Vitucci | G06Q 20/4016 |
| 2026/0051378 | A1* | 2/2026 | Nehzati | G06F 16/27 |
| 2026/0073139 | A1* | 3/2026 | Santhanam | G06F 40/279 |
| 2026/0080687 | A1* | 3/2026 | Odeh | G06V 20/52 |
| 2026/0104949 | A1* | 4/2026 | Ulianchenko | G06F 9/543 |

OTHER PUBLICATIONS

RFC 9449: "OAuth 2.0 Demonstrating Proof of Possession (DPOP)"—IETF—Sep. 2023.
RFC 9162: "Certificate Transparency Version 2.0"—Laurie, Messeri, Stradling—Dec. 2021.
RFC 3161: "Internet X.509 Public Key Infrastructure Time-Stamp Protocol (TSP)"—IETF—Aug. 2001.
RFC 9052: "CBOR Object Signing and Encryption (COSE): Structures and Process"—IETF—Aug. 2022.
Snowflake Inc., "AI + Data Predictions 2026: The Year of Agents and Ecosystems," Snowflake Inc., © 2025.
"Survivable Key Compromise in Software Update Systems"—Samuel et al.—Published Oct. 4, 2010.
"In-toto: Providing farm-to-table guarantees for bits and bytes"—Torres-Arias et al.—USENIX Security 2019.
Mooney, Mallory, "AI Security Best Practices Guide" (Best Practice Series), Datadog, Oct. 30, 2025.
"Not what you've signed up for: Compromising Real-World LLM-Integrated Applications with Indirect Prompt Injection"—Greshake et al.

* cited by examiner

SYSTEM OVERVIEW (100)

AGENT AUTHORITY RAIL (110)

DELEGATION GRAPH AND REVOCATION PROPAGATION

CONNECTOR TRUST MEDIATION (150)

RECEIPT EXCHANGE SERVICE (170)

OFFLINE VERIFICATION (190)

RECEIPT CHAINING AND CORRELATION IDENTIFIERS

SELECTIVE DISCLOSURE AND PRIVACY-PRESERVING BUNDLES

END-TO-END OPERATION FLOW

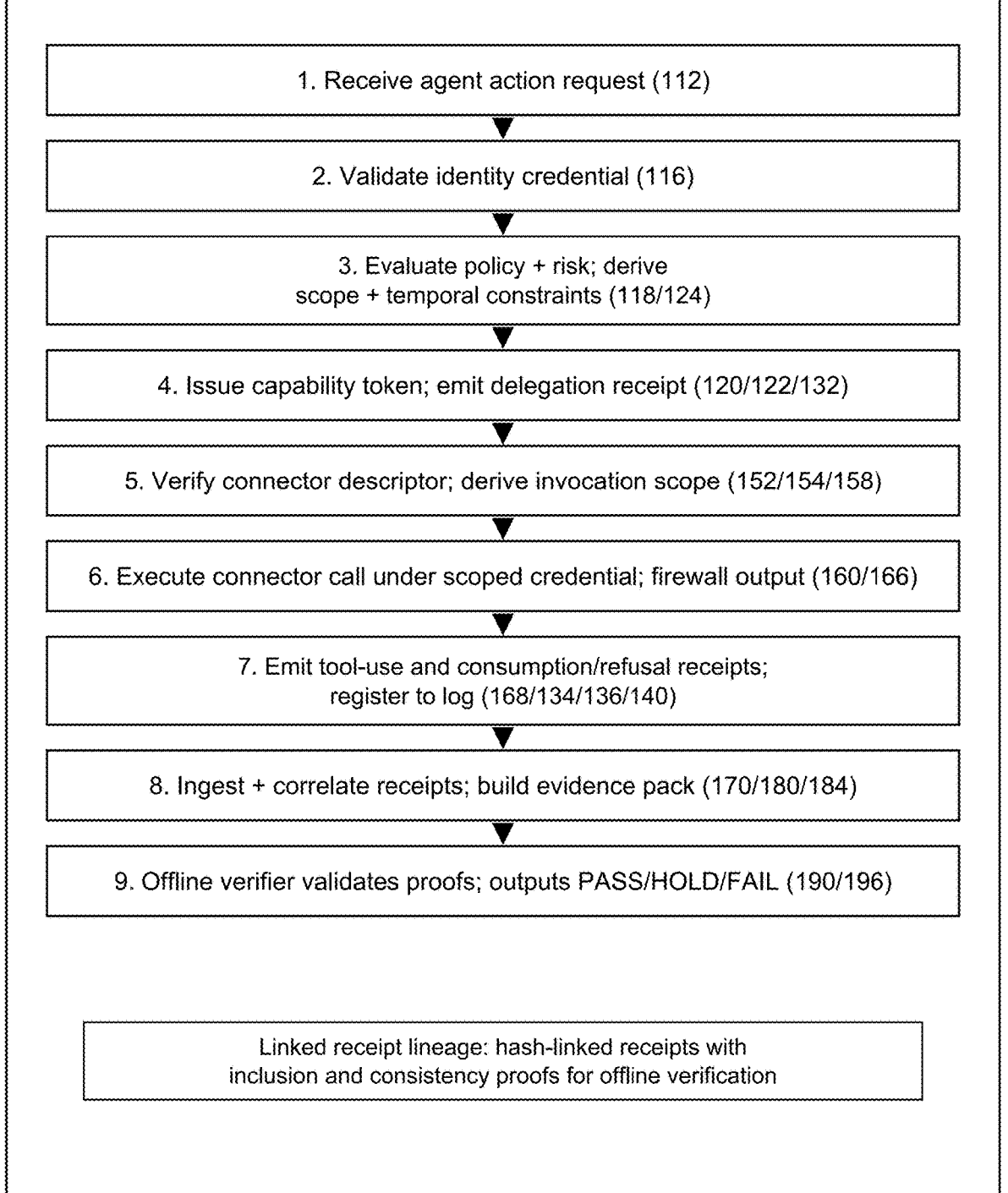

1. Receive agent action request (112)

2. Validate identity credential (116)

3. Evaluate policy + risk; derive
scope + temporal constraints (118/124)

4. Issue capability token; emit delegation receipt (120/122/132)

5. Verify connector descriptor; derive invocation scope (152/154/158)

6. Execute connector call under scoped credential; firewall output (160/166)

7. Emit tool-use and consumption/refusal receipts;
register to log (168/134/136/140)

8. Ingest + correlate receipts; build evidence pack (170/180/184)

9. Offline verifier validates proofs; outputs PASS/HOLD/FAIL (190/196)

Linked receipt lineage: hash-linked receipts with
inclusion and consistency proofs for offline verification

FIG. 9

CANONICAL ENCODING AND DIGEST GENERATION

CONTEXT FIREWALL STATE MACHINE (166)

VERIFICATION PROFILE DSL AND RULE EVALUATION

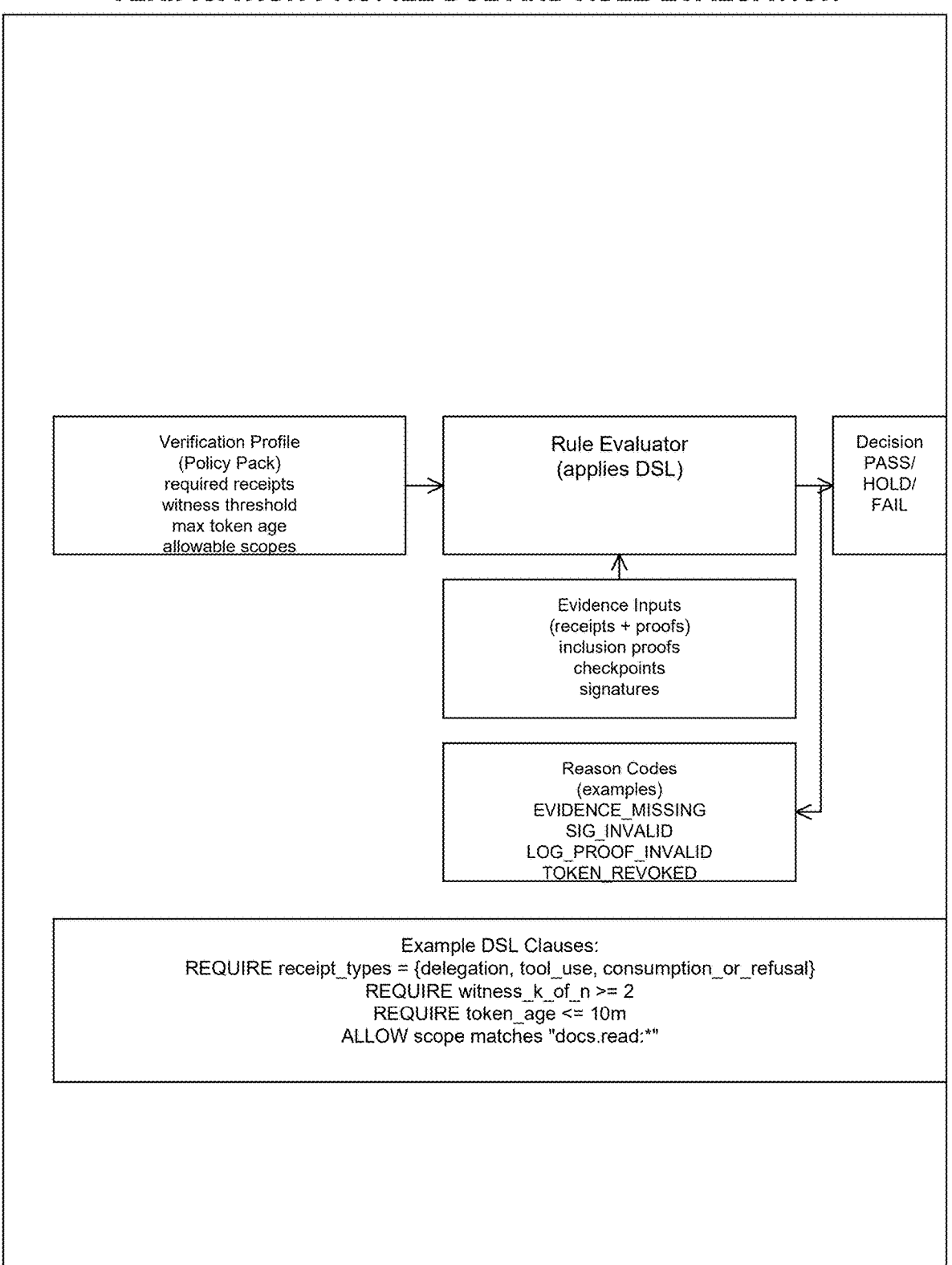

Verification Profile
(Policy Pack)
required receipts
witness threshold
max token age
allowable scopes Rule Evaluator
(applies DSL)

Decision
PASS/
HOLD/
FAIL

Evidence Inputs
(receipts + proofs)
inclusion proofs
checkpoints
signatures

Reason Codes
(examples)
EVIDENCE_MISSING
SIG_INVALID
LOG_PROOF_INVALID
TOKEN_REVOKED Example DSL Clauses:
REQUIRE receipt_types = {delegation, tool_use, consumption_or_refusal}
REQUIRE witness_k_of_n >= 2
REQUIRE token_age <= 10m
ALLOW scope matches "docs.read:*"

FIG. 12

OUTAGE MODE, FEDERATION, AND WITNESS ECOSYSTEM

IDENTITY-BOUND DELEGATED AUTHORIZATION, CONNECTOR MEDIATION, AND OFFLINE-VERIFIABLE RECEIPT LINEAGE FOR AGENTIC SYSTEMS

CROSS-REFERENCE TO RELATED APPLICATIONS

Not applicable.

FIELD

The present disclosure relates to computer security and governance for agentic and autonomous software systems. More particularly, the disclosure relates to integrated control architectures that bind delegated authority to verified agent identity, constrain connector and tool invocation, isolate tool output from privileged instruction channels, and generate cryptographically verifiable receipt lineage that can be validated offline.

BACKGROUND

Autonomous and semi-autonomous agents increasingly perform operations against protected resources, including files, databases, messaging systems, transaction endpoints, workflow engines, and administrative interfaces. In many deployments, such agents act through one or more connectors or tools that translate an agent request into calls against external applications or services.

Certain existing approaches issue credentials or session tokens to software components without maintaining a deterministic cryptographic relationship among the original request, the delegated authority, the connector permissions actually used, and the final outcome. As a result, later reconstruction of how a particular action became authorized can be ambiguous, incomplete, or dependent on operator assertions.

Certain existing logging approaches provide event records that are useful for operations, but such records may be distributed across multiple systems, may not share canonical correlation semantics, and may be difficult to validate independently when one or more producing systems are unavailable or untrusted.

Agentic tool-execution pipelines introduce additional attack surfaces. For example, a connector descriptor can be replaced or modified, a tool can return output that attempts to influence later control decisions, or a model can be induced to request actions outside intended least-privilege boundaries. These risks can arise even when individual subsystems appear secure in isolation.

Non-human identities, such as workload identities, service principals, agent instances, connector runtimes, and ephemeral tool credentials, may proliferate rapidly. Without bounded delegation, replay resistance, and revocation propagation, privilege sprawl may occur across parent and child operations that are difficult to enumerate at incident time.

Certain compliance and assurance workflows rely on human-readable reports or vendor attestations that do not preserve enough machine-verifiable structure to allow deterministic offline replay of authorization, invocation, refusal, revocation, and outcome events. In such settings, verification may depend on continuing access to online services or proprietary internal state.

Accordingly, there remains a need for an integrated technical control architecture that causes delegated authority, connector execution, output isolation, and later verification to share a common cryptographic lineage rather than functioning as disconnected modules.

SUMMARY

Disclosed embodiments provide an integrated control architecture for agentic systems in which a canonicalized request digest, an identity-bound capability token, a verified connector descriptor, a context firewall, and a linked receipt chain are generated and processed as parts of a single technical pipeline.

In some embodiments, the integrated control architecture provides admit-before-fulfillment semantics in which execution of an operation is conditioned on satisfaction of one or more evidence requirements at defined control points, such that missing, stale, or unverifiable evidence deterministically yields a HOLD or DENY disposition under an active policy or verification profile rather than a silent ALLOW.

In some embodiments, an authority service receives an action request from an agent, verifies an identity credential bound to an agent-held key, validates proof-of-possession freshness, canonicalizes selected request fields according to deterministic encoding rules, and computes a request digest using a domain-separated hash.

In some embodiments, the authority service evaluates one or more policies, computes or retrieves a risk score, derives a least-privilege capability scope and one or more temporal constraints, and issues a capability token cryptographically bound to the verified identity credential, the request digest, and the derived scope.

In some embodiments, a connector mediation service resolves a connector descriptor for a target connector, verifies a cryptographic integrity assertion for the connector descriptor, checks descriptor revocation and validity windows, and derives an invocation scope as a constrained function of the capability scope, declared connector permissions, and policy constraints.

In some embodiments, the connector mediation service obtains an ephemeral access credential limited to the invocation scope and temporal constraints and executes a connector call using a model-to-tool interaction transport. The invocation scope may be narrower than both the capability scope and the descriptor-declared permission set.

In some embodiments, a context firewall stores instruction input and tool output in separate channels, parses tool output into typed segments, assigns trust-state tags, and blocks promotion of tool output into privileged instruction or executable parameter state unless one or more verification rules are satisfied at a designated control point.

In some embodiments, the architecture emits cryptographically linked receipts for delegation, tool invocation, consumption, refusal, revocation, promotion, checkpoint, and verification events. Each receipt may include a canonical payload encoding, a receipt digest, one or more parent digests or parent chain hashes, correlation identifiers, and a control-point identifier.

In some embodiments, linked receipts are registered in an append-only transparency log that returns an inclusion proof, a consistency proof, or a checkpoint commitment. A witness layer may co-sign checkpoints or registrations according to threshold rules, and a checkpoint may be anchored to one or more external timestamping or immutable-ledger services.

In some embodiments, an offline verifier obtains a verification bundle comprising receipts, proofs, checkpoints, keys, trust roots, and one or more verification profiles. The verifier reconstructs lineage from delegated authority through connector invocation and output-promotion decisions without requiring online access to a receipt producer.

In some embodiments, canonicalization rules specify mandatory field order, optional-field ordering, null markers, extension handling, hash agility, critical-extension semantics, and duplicate-suppression identifiers. As a result, independently implemented verifiers can recompute identical digests and reason deterministically about redacted or selectively disclosed content.

In some embodiments, a delegation graph records parent-child relationships among capability tokens, derived tokens, sessions, and invocations. Revocation propagates through the graph according to configurable depth, fan-out, and partial-scope rules, and delayed consumers can be forced into HOLD or DENY states if required freshness evidence is stale or missing.

In some embodiments, selective disclosure is achieved by field-level commitments, Merkle-subtree proofs, pseudonymous identifiers, zero-knowledge or proof-placeholder constructions, or combinations thereof, such that an auditor can verify policy satisfaction or lineage integrity without learning all underlying request attributes.

In some embodiments, the architecture improves computer security by changing how authority, tool execution, and proof validation interact at runtime, including by separating control-plane and data-plane channels, narrowing executable scope as a constrained intersection of multiple independent limits, and binding each state transition to later-verifiable cryptographic evidence.

In some embodiments, proof size for log membership grows logarithmically with log size, offline verification proceeds without live access to producing services, and revocation traversal cost is bounded by configured delegation depth and fan-out limits. These are technical effects that arise from the disclosed data structures and state transitions rather than from post hoc reporting alone.

4

Figure 6:
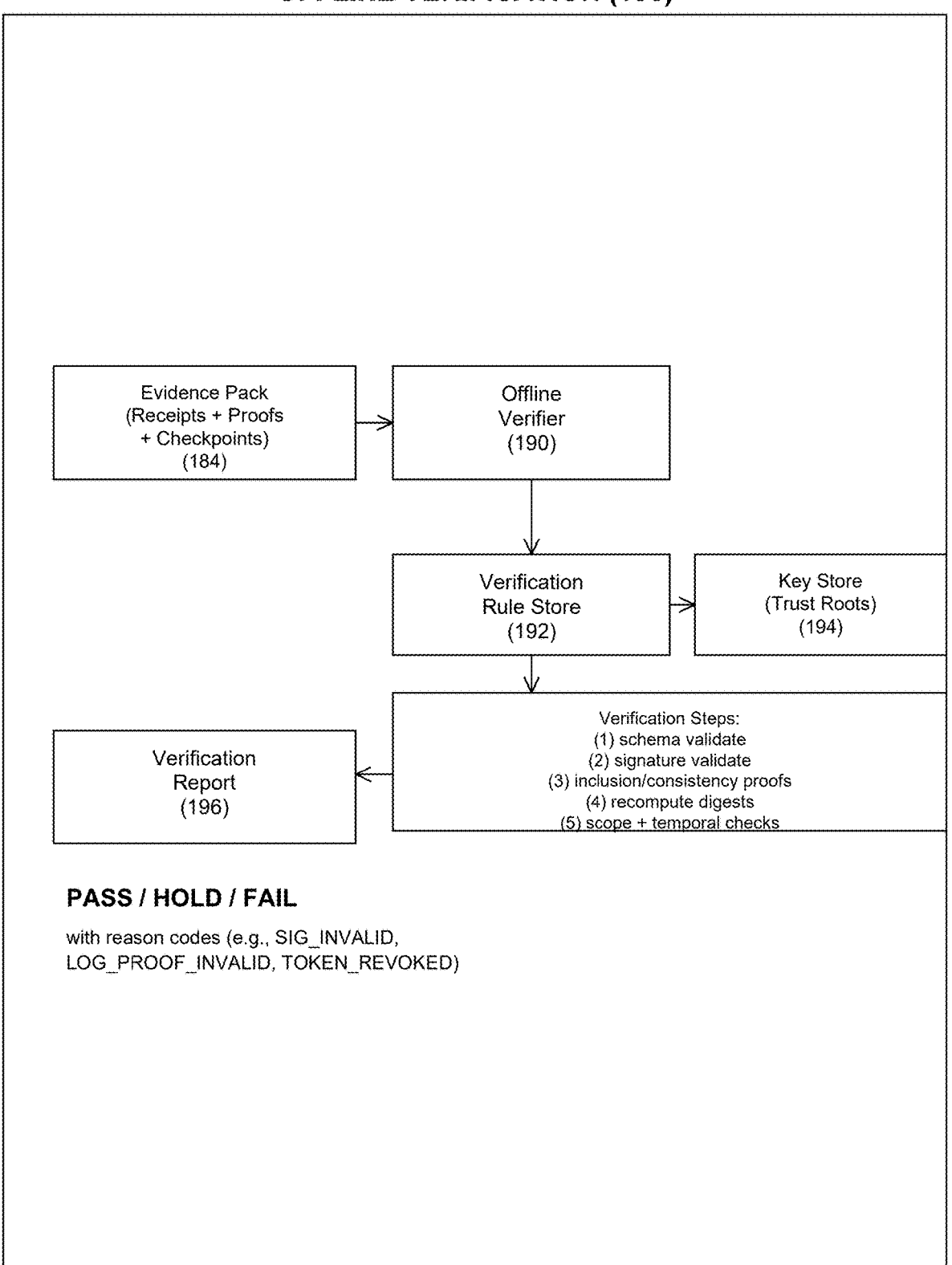

FIG. 6 is a diagram of offline verification including proof validation, rule evaluation, and PASS/HOLD/FAIL reporting, in accordance with some embodiments.

Figure 7:
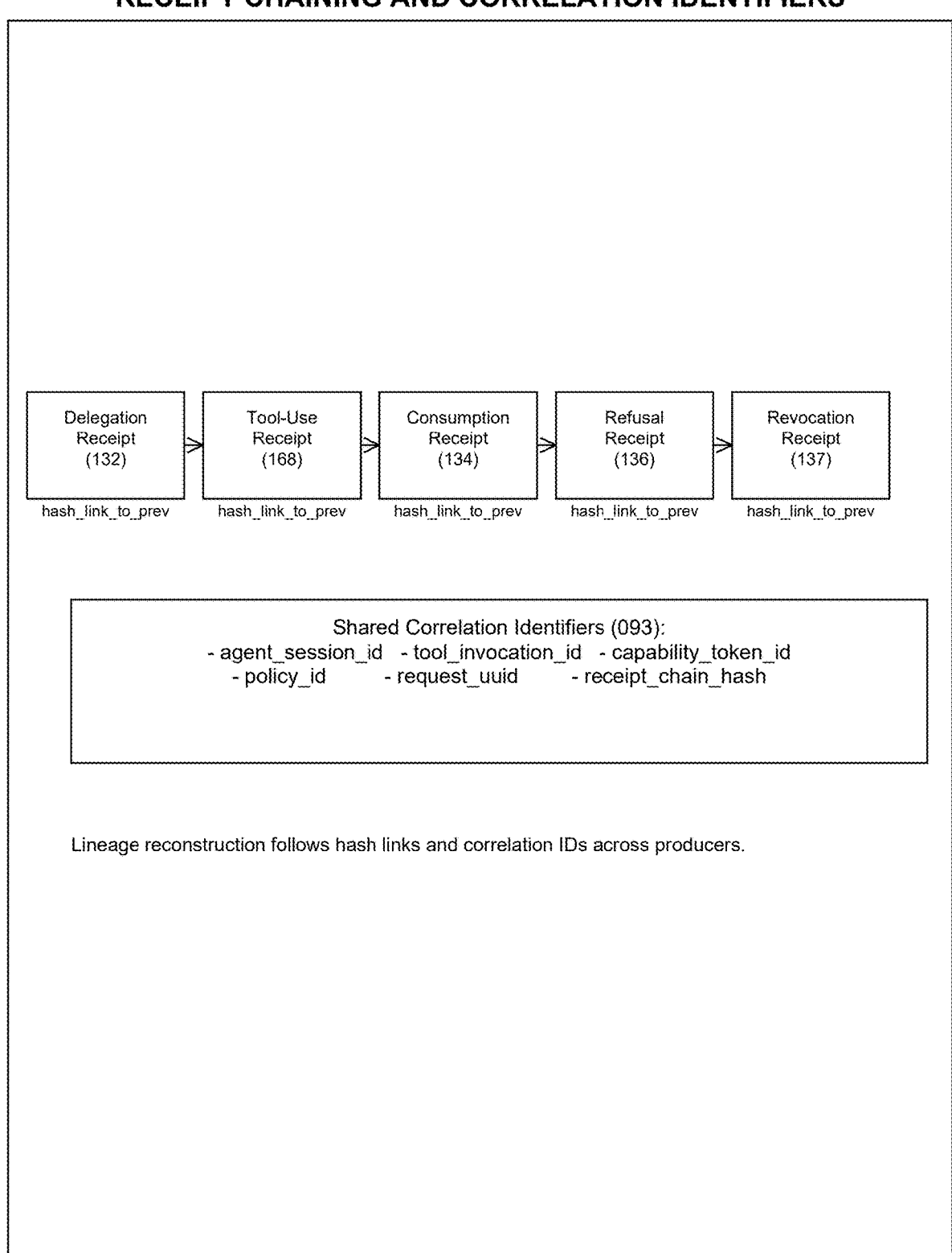

FIG. 7 is a diagram of receipt chaining and shared correlation identifiers used to reconstruct action lineage across multiple receipts, in accordance with some embodiments.

Figure 8:
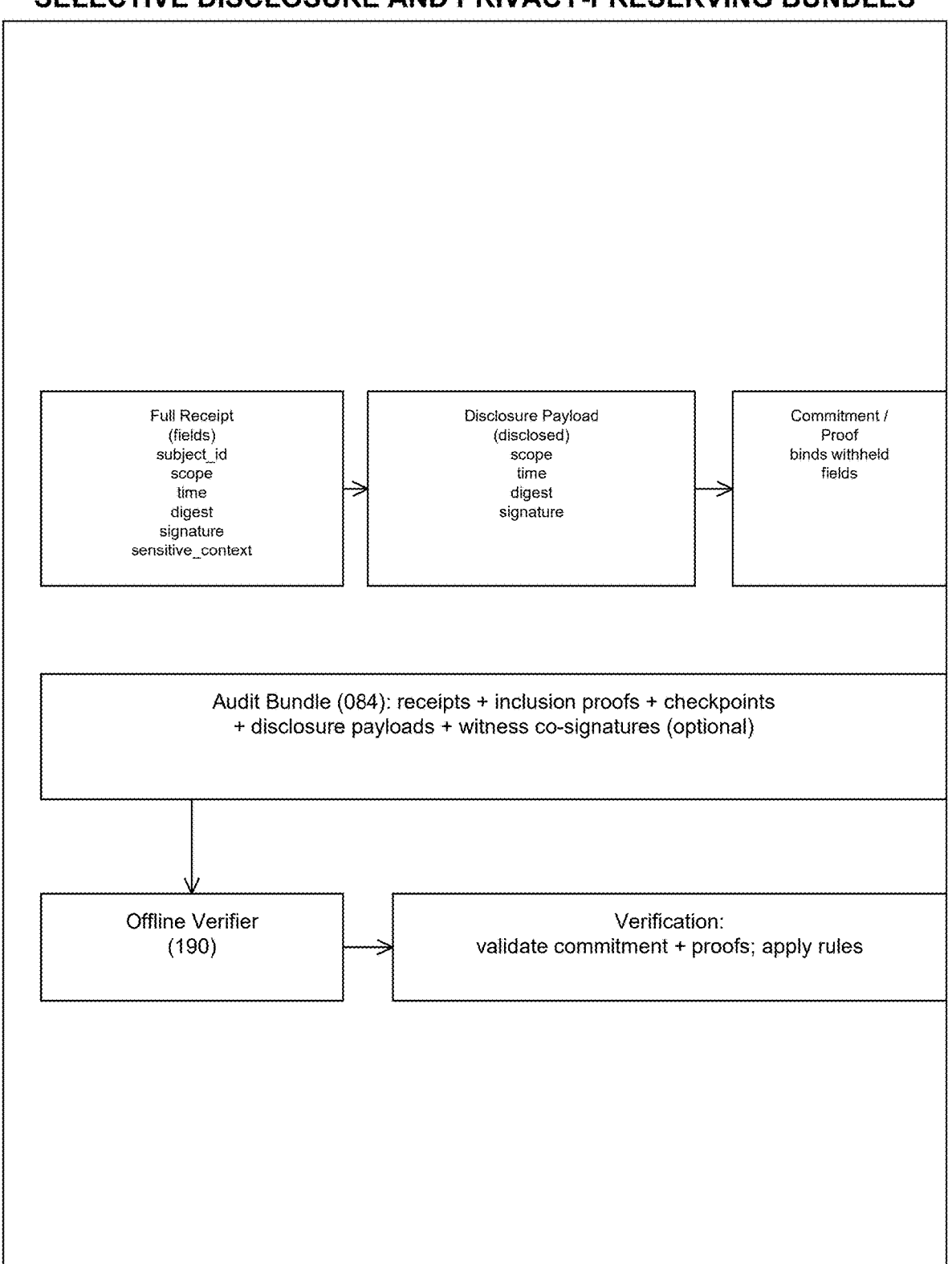

FIG. 8 is a diagram of selective disclosure and privacy-preserving bundles including disclosed fields, commitments or proofs for withheld fields, and offline verification of the disclosed package, in accordance with some embodiments.

FIG. 9 is a flow diagram of an end-to-end agentic operation including authorization, connector mediation, receipt registration, evidence-pack generation, and offline verification, in accordance with some embodiments.

Figure 10:
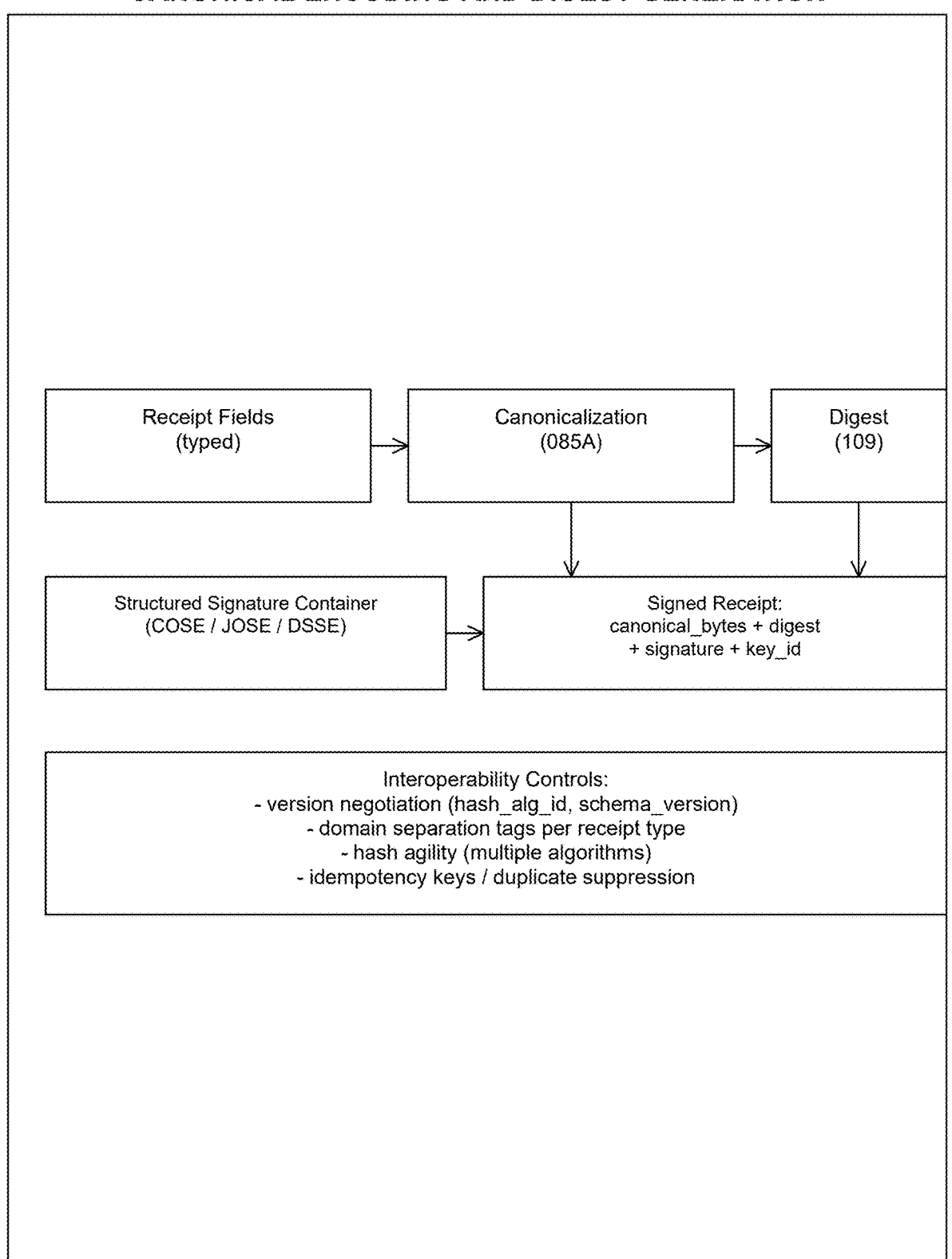

FIG. 10 is a diagram illustrating canonical encoding and digest generation together with structured signature-container and interoperability controls, in accordance with some embodiments.

Figure 11:
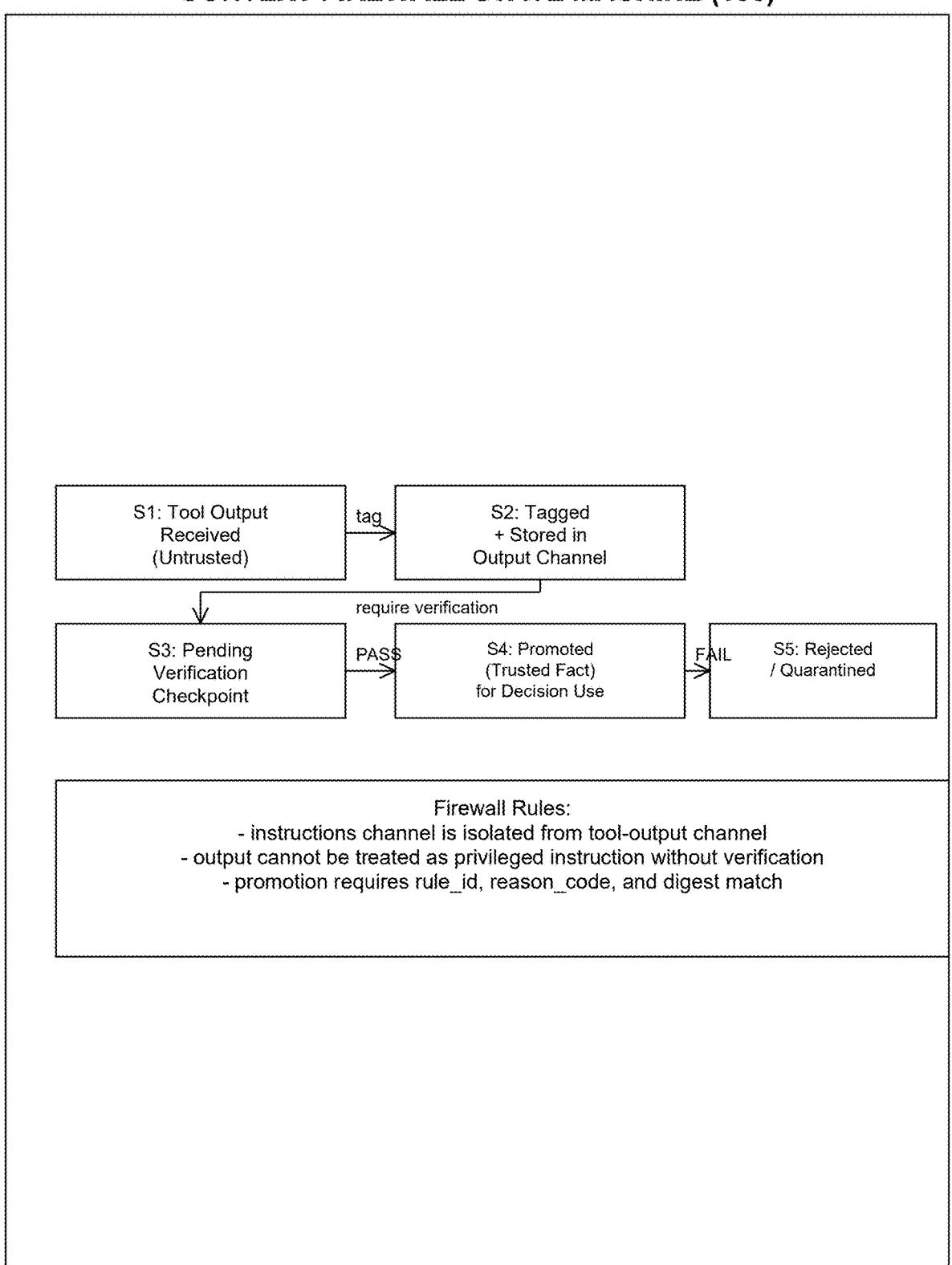

FIG. 11 is a context-firewall state diagram showing tagged tool-output handling, verification checkpoints, promotion, and quarantine states, in accordance with some embodiments.

FIG. 12 is a diagram of a verification-profile domain-specific language and rule evaluation against evidence inputs to output PASS, HOLD, or FAIL, in accordance with some embodiments.

Figure 13:
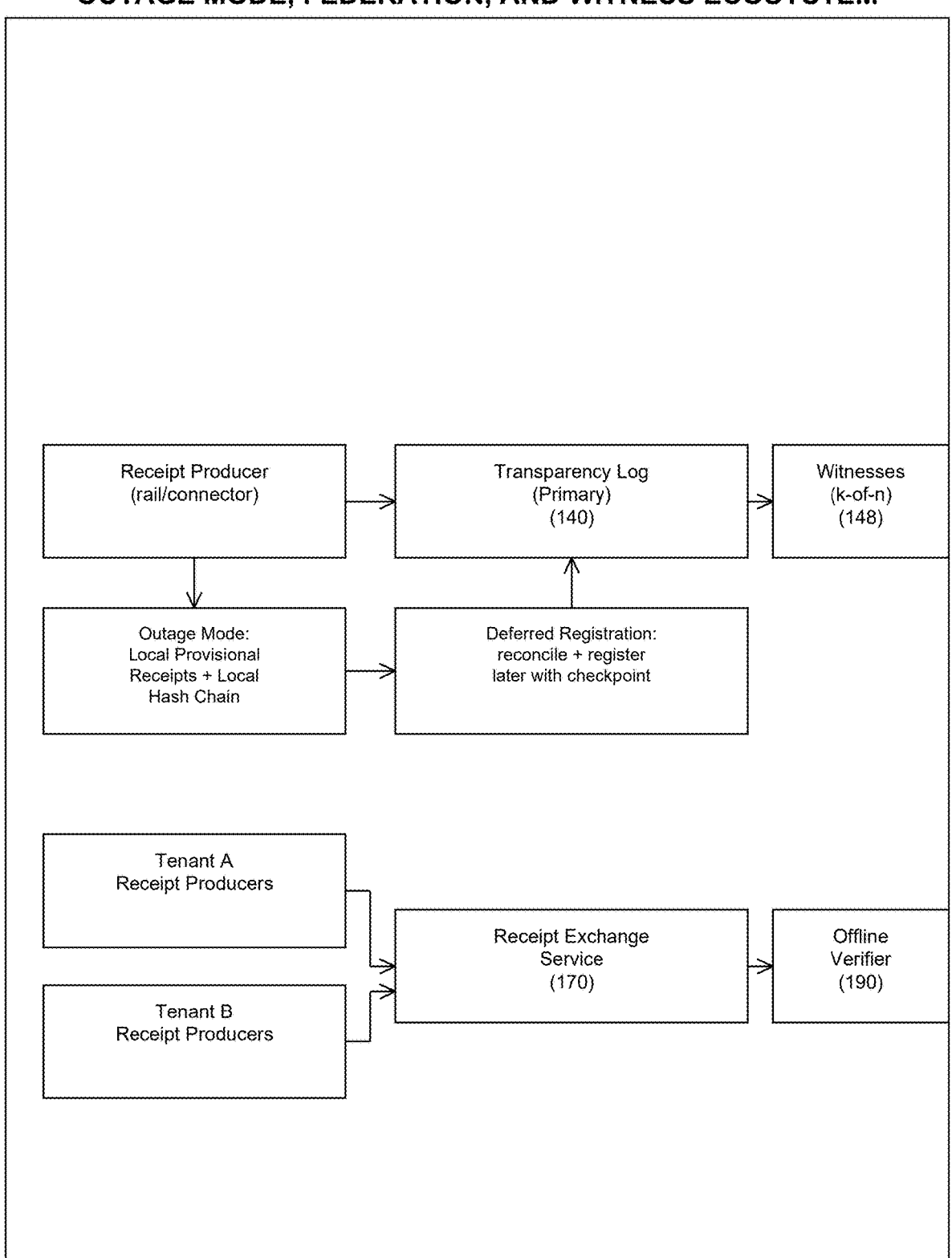

FIG. 13 is a diagram illustrating outage mode, deferred registration, federation, and witness ecosystem interactions, in accordance with some embodiments.

REFERENCE NUMERALS

Reference numerals used in the drawings may include: 084 audit bundle; 085A canonicalization process; 093 shared correlation identifiers; 100 integrated control architecture; 109 digest; 110 agent authority rail; 112 request interface; 114 agent identity wallet; 116 identity credential validator; 118 policy engine and risk scoring engine; 120 capability token issuer; 122 capability token; 124 temporal constraint module; 126 delegation graph store; and 128 revocation propagator.

Additional reference numerals may include: 130 receipt generator; 132 delegation receipt; 134 consumption receipt; 136 refusal receipt; 137 revocation receipt; 138 receipt signer; 140 append-only transparency log; 142 log registrar; 144 inclusion proof; 146 consistency proof; 148 witness service; 150 connector trust mediation system; 152 connector descriptor resolver; 154 connector descriptor; 156 integrity verifier; 158 scope-derivation engine; 160 connector call executor; 162 external application or service; 164 tool output; 166 context firewall; and 168 tool-use receipt.

Additional reference numerals may include: 170 compliance receipt exchange service; 172 receipt ingestion API; 174 schema validator; 176 signature verifier; 178 correlation engine; 180 audit-bundle generator; 182 query API; 184 evidence pack; 186 bill-of-materials generator; 190 offline verifier; 192 verification rule store; 194 key store; and 196 report generator.

Additional reference characters or textual labels appearing in the drawings may identify operational states, receipts, proof types, checkpoints, DSL clauses, or federation elements without requiring separate numerals for every illustrative item.

The same reference numeral may be used in multiple drawings to identify the same or similar element, feature, or output in different views.

The drawings are illustrative and not limiting; unlabeled intermediary logic, queues, caches, proof data, or transport structures described herein can be implemented even where not expressly numbered in a particular figure.

DETAILED DESCRIPTION

The following description is presented to enable a person of ordinary skill in the art to make and use the disclosed subject matter. Numerous specific details are provided for explanation. It will be apparent, however, that the disclosed subject matter may be practiced without one or more of these specific details or with alternative arrangements. The drawings and examples are illustrative rather than limiting.

Unless expressly stated otherwise, the singular includes the plural and the plural includes the singular. The term "or" is inclusive. The term "agent" includes an autonomous agent, a semi-autonomous agent, an orchestration component, a workflow executor, an assistant, or another software component that initiates or mediates operations against a protected resource. Examples include large language model (LLM)-based agents, tool-calling assistants that invoke connectors on behalf of users, and autonomous workflow orchestrators that chain multiple tools or connectors together.

A protected resource may include a file, a database object, a message channel, an application programming interface, a transaction endpoint, an operating-system control, a device action, an administrative command, or another security-sensitive operation target.

A protected resource may additionally include a content-addressed object, a document attachment, a URI or handle representing an object in a storage system, or another reference whose dereference or use performs a security-sensitive operation.

An identity credential may include a certificate, a token, a signed attestation, a remote-attestation artifact, a hardware-backed assertion, or another cryptographic proof associated with an agent-held key. A verified identity credential is not limited to any particular standard.

A connector descriptor may include metadata that describes a connector runtime, version, build fingerprint, declared permissions, endpoint identifiers, sandbox class, attestation measurements, software bill of materials digest, validity window, tenant isolation markers, or combinations thereof. In the claims, the term connector descriptor is used as the primary term, and a signed manifest is one example of such a connector descriptor.

An append-only transparency log refers to a data structure that allows detection of post-registration modification and supports later verification of inclusion or history extension. Merkle-tree logs, hash-chain logs, verifiable maps, or hybrid constructions are examples. A tamper-evident log is one example of an append-only transparency log.

Offline verification refers to verification performed without requiring live access to the system that originally produced a receipt. Offline verification may still use a local trust-root store, a previously obtained checkpoint, or a locally available verification profile.

The disclosed architecture is described as an integrated control architecture because the authority service, connector mediation service, context firewall, receipt chain service, and offline verifier share common canonicalization, correlation, control-point, and digest semantics. The shared semantics allow the same action lineage to be reconstructed across subsystems rather than inferred after the fact from loosely related logs.

Figure 1:
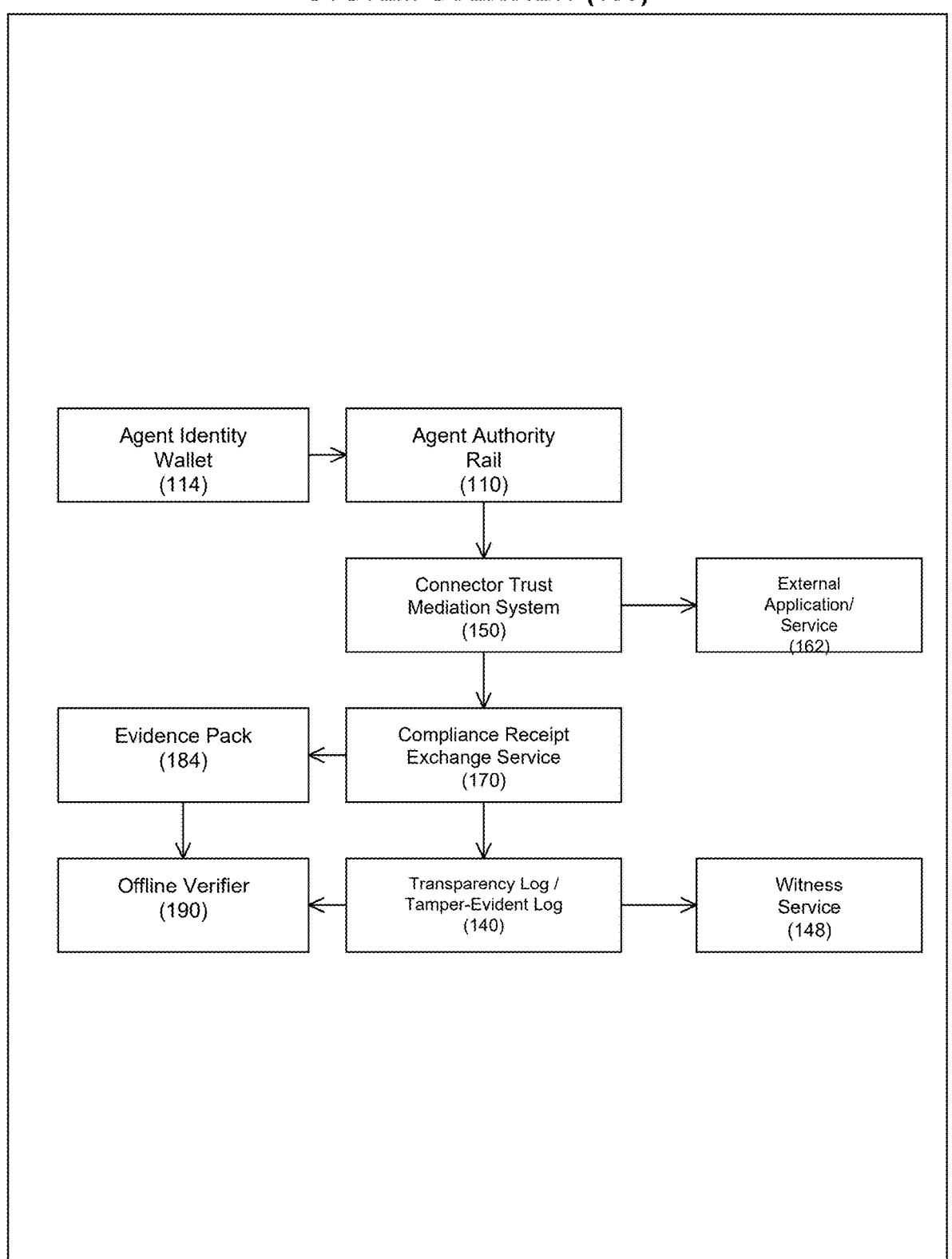
FIG. 1 is a system overview of an integrated control architecture including an agent authority rail, a connector trust mediation system, a compliance receipt exchange service, a transparency log, a witness service, and an offline verifier, in accordance with some embodiments.

System Overview (FIG. 1)

FIG. 1 illustrates integrated control architecture 100. In an example flow, agent authority rail 110 receives an action request from an agent runtime, verifies an agent identity credential, canonicalizes selected request data, derives a least-privilege capability scope, and issues capability token 122. Connector trust mediation system 150 then verifies connector descriptor 154, derives an invocation scope from capability token 122 and connector descriptor 154, executes a connector call against external application or service 162, and provides resulting tool output 164 to context firewall 166.

Context firewall 166 keeps instruction input and tool output 164 logically and, in some embodiments, physically separated. Tool output 164 is not treated as a privileged instruction solely because it is syntactically persuasive or semantically relevant. Instead, tool output 164 may only affect privileged execution if the context firewall 166 determines that one or more verification rules are satisfied at a designated control point.

Compliance receipt exchange service 170 can ingest signed receipts from agent authority rail 110, connector trust mediation system 150, context firewall 166, and other producers; correlate the receipts; generate audit bundles and evidence pack 184; and coordinate registration in append-only transparency log 140 through log registrar 142. Witness service 148 may co-sign checkpoints or specific receipt registrations, and bill-of-materials generator 186 may describe connectors, policies, or receipt formats included in a verification bundle.

Offline verifier 190 receives a verification bundle including receipts, proofs, checkpoints, trust roots, and one or more verification profiles. Offline verifier 190 consults verification rule store 192 and key store 194, replays the lineage, validates signatures and proofs, evaluates completeness and control-point requirements, and emits a PASS, HOLD, or FAIL result through report generator 196.

Figure 2:
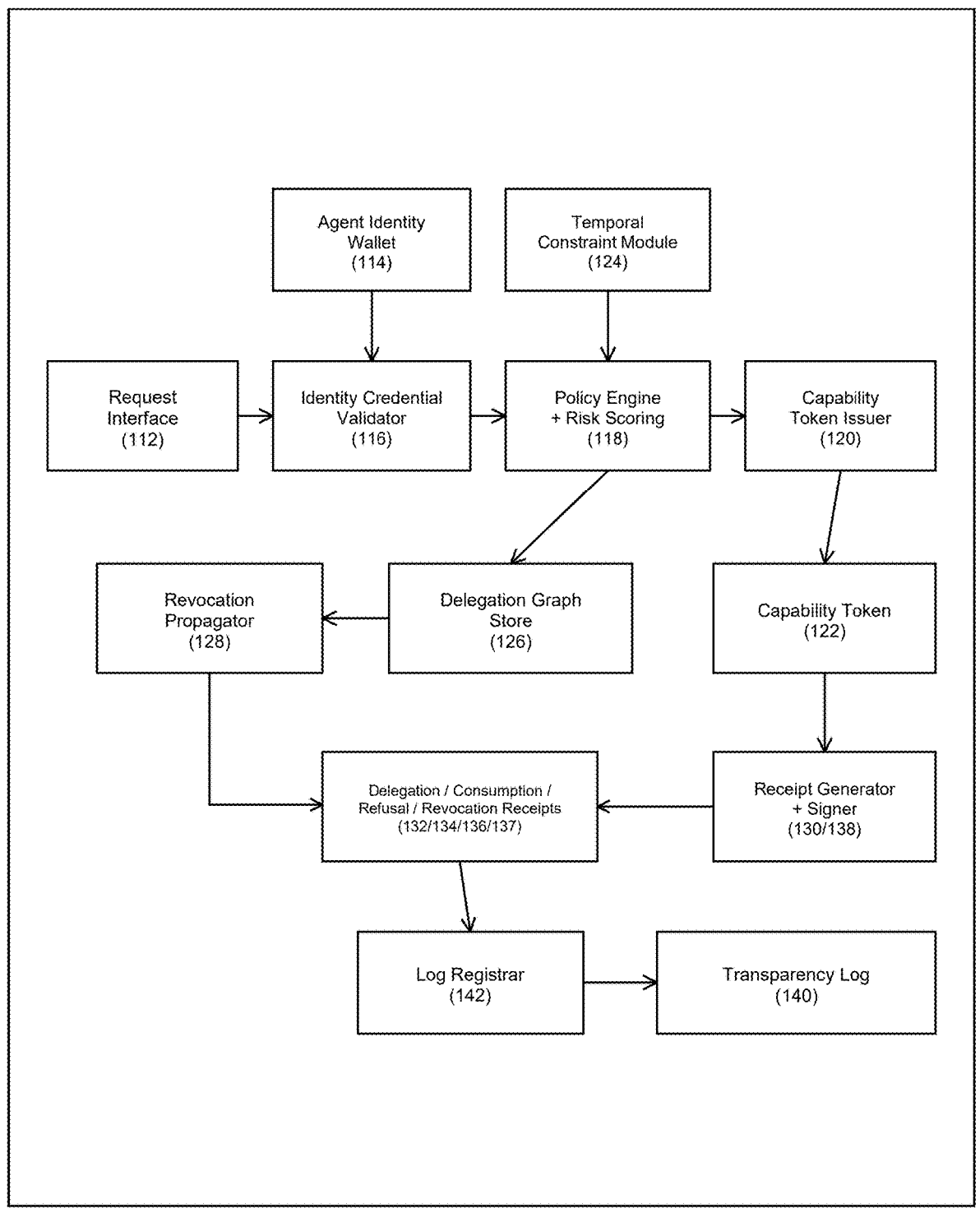
FIG. 2 is a component diagram of the agent authority rail showing request intake, identity verification, policy and risk evaluation, temporal-constraint determination, capability-token issuance, receipt generation, and receipt registration, in accordance with some embodiments.

Agent Authority Rail and Canonical Encoding (FIGS. 2 and 10)

In some embodiments, request interface 112 receives an action request containing at least a request identifier, an agent identity reference, a requested operation, a target resource identifier, one or more parameters, and a request context. The request context may include session data, user delegation data, workflow identifiers, environment identifiers, trust labels, or previous correlation identifiers.

As illustrated in FIG. 10, canonicalization process 085A can select a subset of request or receipt fields for digest generation according to a canonicalization profile. The selected fields can be chosen so that later verification does not depend on non-deterministic data such as transport-level headers, presentation ordering, or incidental whitespace.

In one example embodiment, a canonical request encoding used by canonicalization process 085A contains fields in a fixed sequence: encoding_version, request_identifier, subject_identifier, action_class, target_identifier, parameter_digest, context_digest, control_point_seed, not_before, not_after, extension_map, and idempotency_key. Optional fields may be encoded with explicit null markers. Extension fields may be encoded in lexicographic order by key after all mandatory fields.

In some embodiments, each canonical encoding uses a deterministic tag-length-value representation. In other embodiments, a canonical JSON, canonical CBOR, or another deterministic serialization is used. The architecture is not limited to a particular canonical format so long as independent implementations generate identical byte strings for the same logical content.

Digest 109 may be computed using a domain-separated hash. For example, request_digest may equal H ("REQv1"‖canonical_request_encoding). Similarly, connector_descriptor_digest may equal H ("DSCv1"‖canonical_descriptor_encoding), tool_output_digest may equal H ("OUTv1"‖canonical_output_encoding), and receipt_digest may equal H ("RCTv1"‖canonical_receipt_encoding). Domain separation reduces cross-context collision ambiguity and supports migration among independently versioned encodings.

In some embodiments, hash agility is implemented by encoding a hash-algorithm identifier in the canonical structure and by constraining verification so that a profile can permit one algorithm, a migration window of algorithms, or a required upgrade path. A receipt may therefore remain verifiable across algorithm transitions without rewriting prior log history.

Duplicate suppression may be achieved by evaluating an idempotency key in a duplicate-suppression store or equivalent state maintained by the architecture. Where a receipt producer receives a repeated submission with the same idempotency key and equivalent canonical digest, the producer can return a prior receipt identifier rather than registering a divergent duplicate. If the same idempotency key appears with a different canonical digest, the producer may emit a refusal or anomaly receipt.

In some embodiments, unknown extension handling uses critical and non-critical extension markers. A verifier encountering an unknown non-critical extension may ignore the extension while preserving the parent digest relation. A verifier encountering an unknown critical extension may output HOLD or FAIL according to the active verification profile. This supports forward-compatible extensibility without silently weakening security properties.

A lineage hash can additionally be computed from a receipt digest and one or more parent digests or parent lineage hashes. In one example, lineage_hash_n=H ("LINv1"‖receipt_digest_n‖parent_lineage_hash_1‖ parent_lineage_hash_2‖control_point_identifier). The lineage hash can therefore capture both content and position in the control flow.

Identity Verification, Policy Evaluation, and Token Issuance (FIG. 2)

Identity credential validator 116 validates that an identity credential is bound to an agent-held key and that the requesting agent demonstrates proof of possession of the corresponding private material. The proof may include a signature over a challenge, a challenge-response attestation, a hardware-backed quote, a mutual-authentication transcript, or a token-bound assertion.

In some embodiments, the verified identity credential and/or a delegated assertion is obtained via standardized delegated token exchange or workload identity federation, including OAuth 2.0 token exchange, token binding, or equivalent mechanisms, such that an agent obtains a scoped, short-lived authorization artifact without exposing a human user's primary credential material.

Freshness validation can bind proof of possession to a nonce, a monotonic counter, a signed timestamp, or a combination thereof. In one embodiment, agent authority rail 110 issues a nonce and requires the agent to sign or attest over the nonce and selected request fields. In another embodiment, the agent provides a monotonic counter value that is checked against a replay cache, append-only freshness ledger, or equivalent stored state.

Freshness validation may tolerate bounded clock skew, missing network time, or disconnected operation by applying a configured skew window and by using trusted checkpoint time where direct wall-clock confidence is unavailable. If freshness cannot be established to a required confidence level, the architecture may output HOLD rather than ALLOW, thereby preserving safety without forcing silent denial in every degraded mode.

Policy engine and risk scoring engine 118 together with temporal constraint module 124 evaluate one or more policies to derive an allowed capability scope and one or more temporal constraints. The scope can include allowed operations, resources, resource patterns, parameter patterns, numerical limits, tenant limits, connector classes, data sensitivity classes, geographical or regulatory constraints, and temporal constraints such as not-before time, expiration, lease duration, and refresh interval.

In some embodiments, the policy engine implements fine-grained authorization using attribute-based access control (ABAC), relationship-based access control (ReBAC), or combinations thereof, to derive scope constraints at resource-, attribute-, or relationship-level granularity, including constraints preventing export, egress, or cross-tenant propagation even where read-only summarization is allowed.

Policy engine and risk scoring engine 118 can compute or retrieve a risk score or risk classification based on one or more signals. Example signals include identity class, recent anomaly indicators, target resource sensitivity, connector trust level, workload criticality, request novelty, prior refusal history, current incident posture, or evidence of descriptor or key rotation. Risk-adaptive tightening can reduce a scope dimension, shorten time-to-live, require additional witnesses, force a human-approval path, or block specified connectors.

In some embodiments, policy engine and risk scoring engine 118 produce a policy_trace_digest that commits to a policy-evaluation trace (e.g., activated rule identifiers or constraint-set identifiers) without necessarily disclosing underlying values, and receipt generator 130 includes the policy_trace_digest in delegation receipt 132, refusal receipt 136, or a dedicated policy-trace receipt to support later audit, selective disclosure, and replay under the active verification profile.

In some embodiments, policy engine and risk scoring engine 118 subscribe to external security or posture signals associated with a subject, device, workload, connector, endpoint, or session, including at least one of endpoint posture change indication, credential-compromise indication, network quarantine, anomaly score increase, descriptor revocation, or policy-pack update. Receipt generator 130 may emit an observation receipt or signal-evaluation receipt binding the received signal to a control point, and the architecture can responsively re-evaluate, narrow, suspend, or revoke capability token 122 or an invocation scope during an active session without waiting for token expiration.

In some embodiments, high-risk actions trigger a human-in-the-loop approval workflow in which agent execution is paused in a non-privileged state until an approval assertion is received, including via backchannel or device-bound approval mechanisms (e.g., client-initiated backchannel authentication or equivalent approval flows).

Capability token issuer 120 issues capability token 122 cryptographically bound to at least the verified identity credential, the request digest, the capability scope, and one or more temporal constraints. In some embodiments capability token 122 also binds to a parent token identifier, a policy identifier, an audience or connector class, and a control-point seed. Capability token 122 may be a signed token, a MAC-protected token, a hardware-protected token, or another cryptographically protected structure.

Receipt generator 130 and receipt signer 138 can emit delegation receipt 132 that references the token identifier, request digest, scope digest, policy identifier, issuer identifier, and time fields. Delegation receipt 132 may further include the risk classification, a control-point identifier, and an identifier for any parent delegation from which authority was derived.

In some embodiments, delegation receipt 132 further includes a policy_pack_identifier and a policy_pack_digest representing a signed and canonicalized policy pack used to derive scope, time bounds, and promotion constraints, so that later verifiers can detect policy-pack substitution even when a policy identifier string is reused.

If policy evaluation or freshness validation fails, receipt generator 130 may emit refusal receipt 136 rather than simply returning an error. Refusal receipt 136 can identify the failed control point, a reason code, the relevant canonical digests, and the verification profile in force, thereby preserving deterministic evidence of refusal.

In some embodiments, the architecture includes an identity-lifecycle and discovery service that discovers, provisions, rotates, suspends, decommissions, or inventories non-human identities, service accounts, workload identities, API credentials, agent runtimes, connector runtimes, or delegated grants. The service can detect unregistered or policy-noncompliant identities, grants, or connectors associated with shadow AI or unauthorized automation and emit one or more lifecycle receipts, discovery receipts, or anomaly receipts that are correlated into the same lineage.

Figure 3:
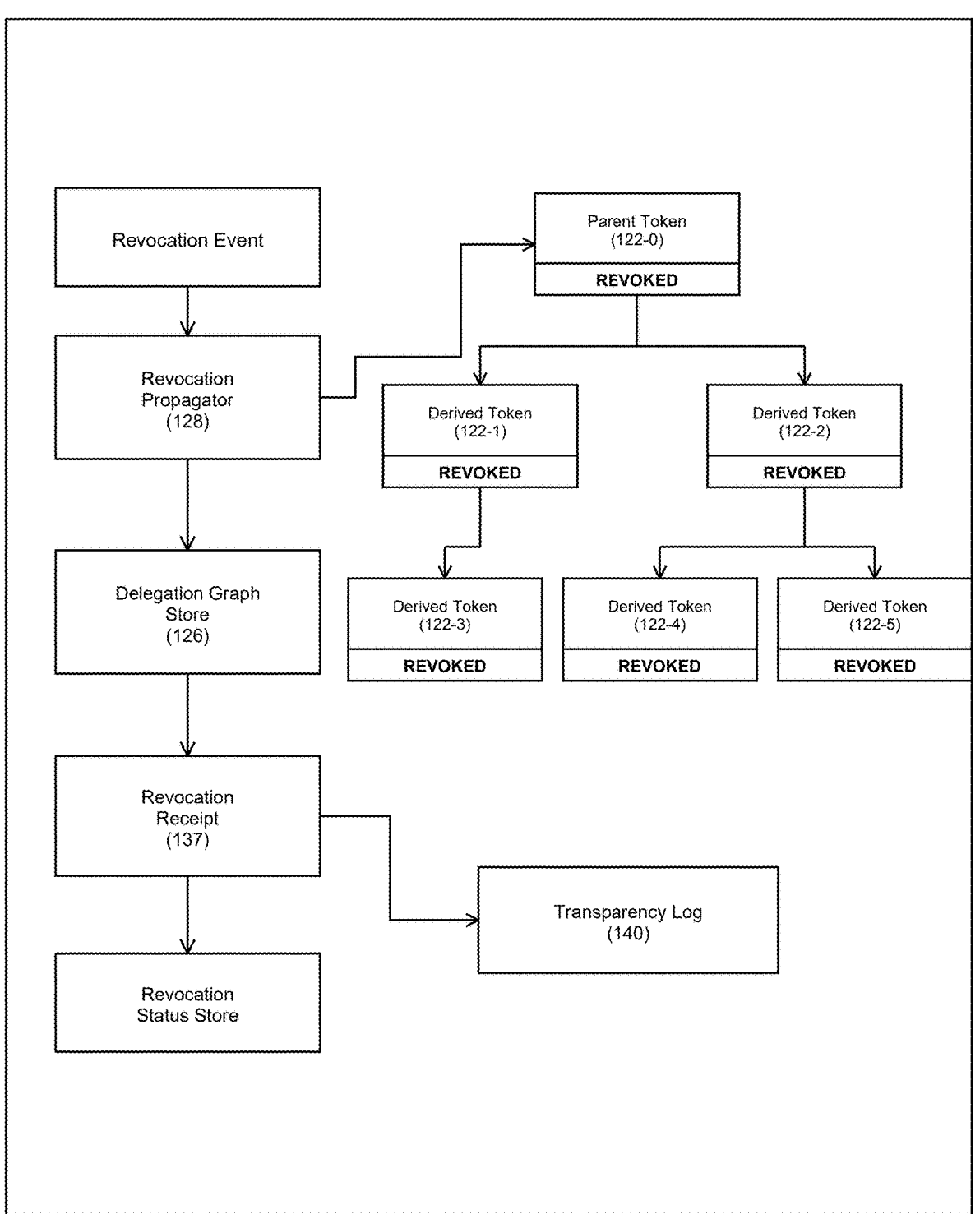
FIG. 3 is a diagram illustrating a delegation graph and revocation propagation through downstream capability tokens and corresponding revocation evidence, in accordance with some embodiments.

Delegation Graph and Revocation Propagation (FIG. 3)

Delegation graph store 126 maintains a graph representing issuance, derivation, session attachment, connector use, and consumption relationships among capability token 122 instances and related receipts. Nodes may correspond to tokens, sessions, connector invocations, or verification checkpoints. Edges may represent derivation, use, approval, promotion, or revocation relationships.

The graph may be a directed acyclic graph in many embodiments, but the disclosure is not limited to a DAG. For example, a session node can reference multiple parent tokens, and a policy node can influence multiple descendant tokens without necessarily being a token itself. The graph is structured so that downstream effect analysis is possible even when a single action depends on multiple upstream approvals.

Revocation propagator 128 may receive a revocation event referencing an identity, a token identifier, a session identifier, a descriptor identifier, a policy identifier, a trust-root identifier, or another subject of revocation. Revocation may be total or partial. A partial revocation may revoke a single resource class, a parameter range, an endpoint, a geography, a time window, or a connector family while leaving unrelated scope dimensions intact.

In some embodiments, revocation event sources include continuous access evaluation signals, shared-signal events, or event-driven posture changes (including SSF/CAEP-style signals or equivalent), enabling near-real-time revocation propagation when risk context changes.

In some embodiments, revocation propagation traverses the graph using breadth-first or depth-first traversal subject to configured maximum depth and fan-out limits. Revocation propagator 128 may emit revocation receipts 137 for directly revoked nodes as well as derived downstream nodes. A downstream node may be invalidated immediately, placed into HOLD pending refresh, or narrowed to a reduced scope according to policy.

Subtree invalidation may be used where a parent token is the exclusive source of authority for a set of child tokens. Where authority is aggregated from multiple parents, the architecture can recompute residual authority by subtracting revoked dimensions and preserving only still-valid dimensions. This allows precise partial invalidation rather than blanket denial when some but not all parent grants remain valid.

Delayed-consumption handling may require a consumer to present a freshness proof or a recent checkpoint before a token can be consumed. If a consumer presents a token with stale revocation evidence, the action may be placed into HOLD until reconciliation occurs. This avoids false ALLOW outcomes caused by offline or lagging consumers.

Replay-cache coordination may be integrated with revocation propagation. For example, when a token or identity is revoked, associated nonces, counters, or cached proof states can be invalidated so that replay of previously valid messages does not resurrect stale authority.

The delegation graph itself can be partially materialized into a receipt chain by embedding parent receipt digests, parent token identifiers, or parent chain hashes in child receipts such as revocation receipt 137 or consumption receipt 134. In this way, the graph can be reconstructed even when a verifier does not have a direct copy of the graph database used during execution.

Figure 4:
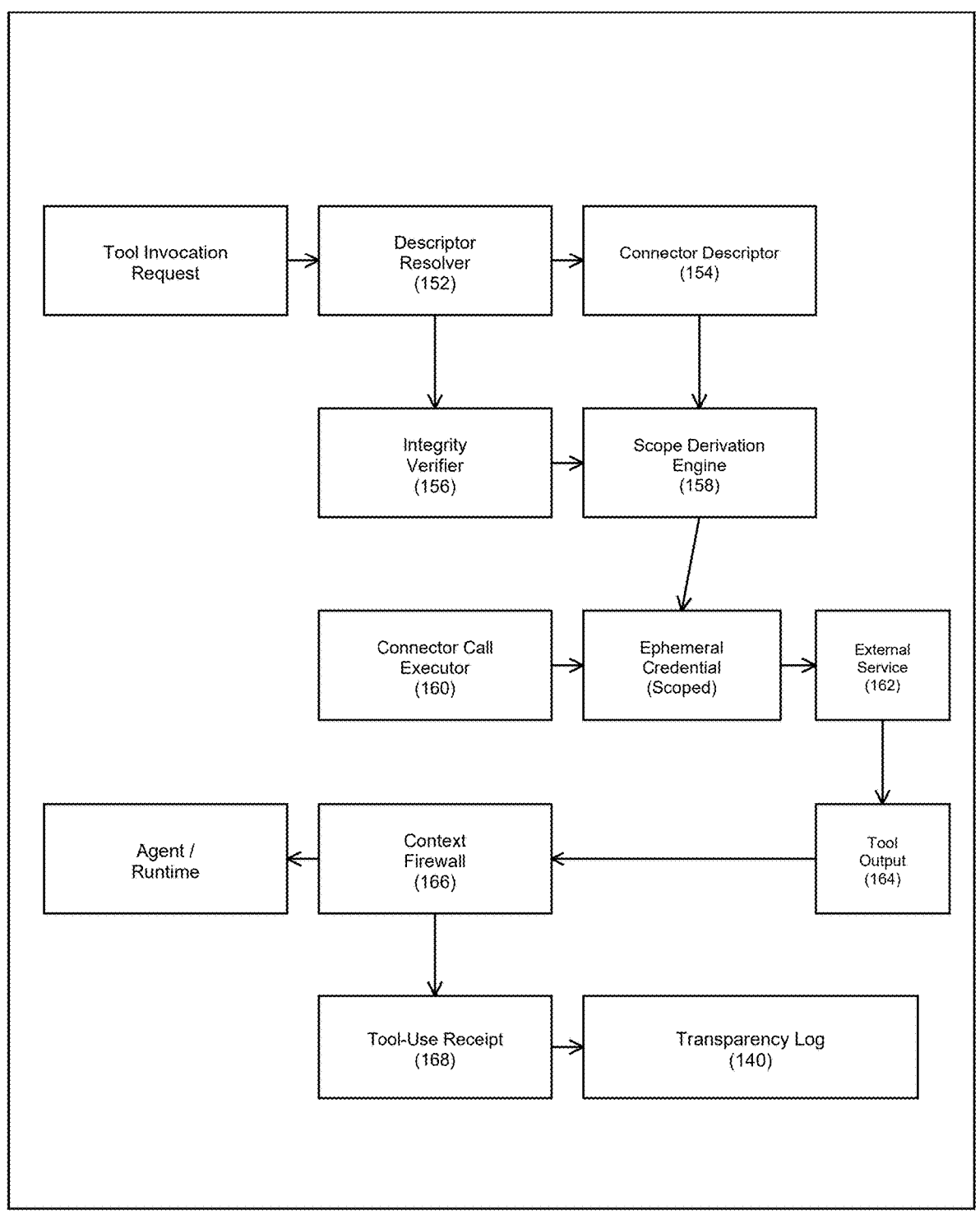
FIG. 4 is a component diagram of connector trust mediation including connector descriptor resolution, integrity verification, invocation-scope derivation, connector execution, context-firewall interaction, and tool-use receipt generation, in accordance with some embodiments.

Connector Trust Mediation and Invocation-Scope Derivation (FIG. 4)

Connector descriptor resolver 152 obtains connector descriptor 154 for a connector that exposes one or more tools relevant to the requested operation. Connector descriptor 154 may be fetched from a local cache, a registry, a repository, a package manifest, a secure enclave, or a remote service.

In some embodiments, a continuous discovery or posture-management process inventories connectors, non-human identities, delegated grants, tokens, and descriptors across environments to detect credential sprawl, authorization drift, and unauthorized "shadow" integrations, and can trigger revocation events, tightening, or HOLD outcomes based on discovered posture changes.

Integrity verifier 156 validates a cryptographic integrity assertion for connector descriptor 154. Validation can include verifying a signature chain to one or more trust roots, verifying a certificate or attestation chain, checking a descriptor validity window, consulting revocation state, validating an attestation measurement, and checking a build fingerprint or software bill of materials digest.

Connector descriptor 154 can declare permissions at multiple granularities. Example declared permissions include action classes, resource patterns, parameter schemas, rate limits, temporal limits, trust labels, endpoint identifiers, data-source classes, output-schema identifiers, sandbox class, network-egress limits, and cross-tenant isolation markers. These descriptor-declared permissions are not automatically granted; rather, they define an upper envelope for later narrowing.

In some embodiments, connector descriptor 154 further includes an output_field_allowlist, one or more parameter_grammar_identifier values, and/or a promotion_policy_identifier that constrain which output fields may be eligible for promotion at context firewall 166, whether embedded in the descriptor or referenced by a policy pack or verification profile.

Scope-derivation engine 158 derives an invocation scope as a constrained function of at least the capability scope, the descriptor-declared permissions, and one or more policy constraints. In one embodiment, the invocation scope is the intersection of these inputs. In another embodiment, the invocation scope is derived by a constraint solver that rejects unsatisfied combinations, resolves policy precedence, and emits a normalized scope vector.

In some embodiments, one or more policy constraints used by scope-derivation engine 158 are expressed using attribute-based access control, relationship-based access control, graph-based authorization, or combinations thereof. Example attributes include resource sensitivity, workflow stage, regulatory zone, tenant class, data residency, or connector trust class. Example relationships include owner-of, reviewer-for, member-of-project, custodian-of-resource, or delegate-of-user, and the invocation scope is derived as a constrained function of such attributes or relationships.

The normalized scope vector may include an operation set, resource set, parameter grammar, endpoint set, data sensitivity class, response schema, lease duration, witness requirement, and output-promotion policy. The normalized scope vector can be hashed and included in consumption receipt 134 and tool-use receipt 168, thereby binding actual invocation authority to later verification.

An ephemeral access credential restricted to the invocation scope may be generated before execution. The effective lifetime of the credential may be the minimum of the capability-token lifetime, the connector-descriptor lifetime, and any policy-imposed maximum lease duration. In some embodiments, the credential is also audience-bound to the target connector or endpoint and cannot be replayed against a different connector or endpoint.

In some embodiments, invocation-scope enforcement is implemented at a policy enforcement boundary such as a gateway, service-mesh sidecar, operating-system hook, or connector sandbox rather than solely by issuing an ephemeral credential, and the boundary enforces the same invocation scope and emits receipts or denial evidence when out-of-scope actions are attempted.

Connector call executor 160 executes the connector call against external application or service 162 under the ephemeral credential. The call may be transported through a model-to-tool interaction protocol, remote procedure call framework, message bus, or direct API call. The disclosure is transport-agnostic. A Model Context Protocol-compatible transport is one example. Connector call executor 160 obtains tool output 164 and can cause receipt generator 130 to emit tool-use receipt 168.

Connector descriptor 154 can additionally carry descriptor-rotation semantics, signer-key rotation semantics, endpoint pinning, sandbox-class transitions, or descriptor-level policy overrides. Because connector descriptor 154 is bound into the same lineage as the request and receipts, a later verifier can determine not only that a connector was used, but also which descriptor state was used.

In some embodiments, trust-root updates, signer-key rotation, and algorithm transitions are governed by one or more verification profiles, and the architecture emits a rotation receipt binding prior trust state, new trust state, effective time window, and checkpoint references so that later verifiers can prove which trust configuration was in force at each control point.

Context Firewall and Output-Promotion Control (FIG. 11)

Context firewall 166 changes how tool output 164 interacts with later execution. Instead of allowing tool output 164 to flow directly into the same memory, prompt, or execution channel used for privileged instructions, context firewall 166 enforces separate handling for control-plane instructions and data-plane outputs.

The firewall maintains separate handling for instruction input and tool output 164. In some embodiments the channels are stored in separate queues, buffers, or memory regions. In other embodiments the channels share memory hardware but are separated by tags, access controls, and parser-enforced boundaries.

Context firewall 166 parses tool output 164 into typed segments. Example segment types include free text, structured fields, numerical parameters, hyperlinks, file handles, executable commands, policy suggestions, safety metadata, and provenance blocks.

Tool output may include references to binary objects, attachments, content-addressed blobs, URIs, or object handles, and such references can be represented as typed segments whose digests are bound into receipts and whose promotion eligibility is constrained by allowlists, grammars, provenance checks, and the invocation scope.

Example trust-state tags include UNTRUSTED_DATA, CANDIDATE_PARAMETER, VERIFIED_EVIDENCE, EXECUTABLE_PARAMETER, PRIVILEGED_INSTRUCTION, and BLOCKED_CONTENT. The architecture can define additional tags or combine tags with labels such as source class, schema identifier, confidence score, or required approval class.

A promotion gate within context firewall 166 controls whether a segment may transition from one trust state to another. In one embodiment, a segment may move from UNTRUSTED_DATA to CANDIDATE_PARAMETER after schema parsing. A segment may move from CANDIDATE_PARAMETER to EXECUTABLE_PARAMETER only if schema conformance, provenance validation, digest matching, policy approval, and control-point requirements are satisfied. A segment may never move directly from UNTRUSTED_DATA to PRIVILEGED_INSTRUCTION.

Verification at the promotion gate can include confirming that the segment originated from an output field declared by verified connector descriptor 154, that the field is permitted by the invocation scope, that the field value conforms to an allowlisted parameter grammar, that any referenced document or dataset digests match expected provenance, and that policy does not classify the field as requiring human or secondary approval.

In some embodiments, a connector descriptor, policy pack, or verification profile defines one or more context-injection constraints identifying which datasets, document classes, fields, object references, retrieval indices, or provenance classes may be supplied to an agent as inference context. Context firewall 166 or another mediation boundary blocks, redacts, or quarantines context material outside the allowed set and can emit a refusal receipt or observation receipt identifying the blocked context-injection attempt.

Where verification fails, context firewall 166 blocks the transition and receipt generator 130 emits refusal receipt 136. Refusal receipt 136 may include the segment hash, original trust-state tag, target trust-state tag, failed rule identifiers, control-point identifier, and reason codes such as CONTEXT_FIREWALL_VIOLATION, OUTPUT_DIGEST_MISMATCH, PROVENANCE_MISSING, or PARAMETER_SCHEMA_INVALID.

Where verification succeeds, context firewall 166 may emit a promotion receipt in addition to or instead of tool-use receipt 168. The promotion receipt can state that a specific output segment, with a specific digest and provenance, was promoted to executable-parameter state at a specified control point under a specified rule set. A later verifier can therefore distinguish merely observed tool output from tool output that actually influenced execution.

In some embodiments, natural-language text from tool output 164 is never allowed to become privileged instruction text. Instead, only schema-bound parameter values can be promoted, and only after normalization. For example, a connector may return a payment amount, a date, or a file identifier that is parsed into a structured field and promoted as an executable parameter, while accompanying natural-language suggestions remain non-executable data.

In other embodiments, a typed segment that is not natural-language text and that satisfies stricter verification rules may be promoted to PRIVILEGED_INSTRUCTION state at a designated control point, and such promotion is recorded by a promotion receipt identifying the control point and applicable rule identifiers.

Context firewall 166 can be implemented in a single process, in separate cooperating processes, in trusted execution environments, or in distributed services. What matters is that the architecture enforces distinct control points for data-plane to control-plane transitions and that those transitions are recorded in the cryptographic lineage.

Figure 5:
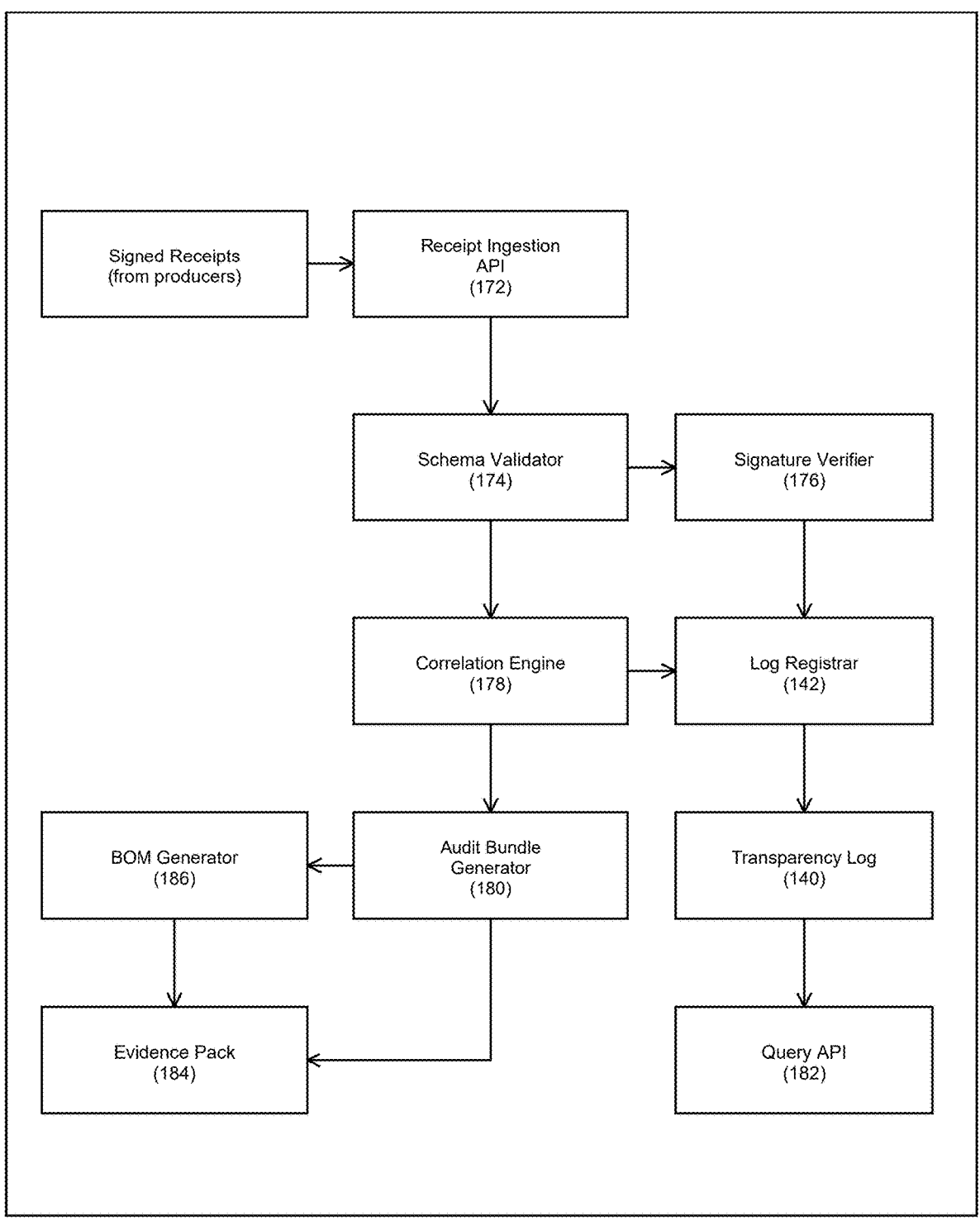
FIG. 5 is a component diagram of a compliance receipt exchange service including receipt ingestion, schema validation, signature verification, correlation, audit-bundle generation, query, and evidence-pack output, in accordance with some embodiments.

Compliance Receipt Exchange, Receipt Chaining, and Transparency Logging (FIGS. 5, 7, and 13)

Compliance receipt exchange service 170 can receive signed receipts from agent authority rail 110, connector trust mediation system 150, context firewall 166, external monitors, and other producers. Receipt ingestion API 172 receives submitted receipts and associated metadata.

Schema validator 174 validates unambiguous receipt structure and semantics. Signature verifier 176 validates signatures using accepted signature containers and trust roots. Verified receipts may then be correlated by correlation engine 178 and prepared for registration in append-only transparency log 140 through log registrar 142.

In some embodiments, receipt signer 138 signs one or more of delegation receipt 132, tool-use receipt 168, consumption receipt 134, refusal receipt 136, a promotion receipt, or revocation receipt 137 using a structured signature container selected from DSSE, COSE, JOSE, or an equivalent structured signature container, and receipt metadata identifies the signature-container type for offline verification.

As illustrated in FIG. 7, receipts can be linked by hash_link_to_prev values, parent digests, lineage hashes, and shared correlation identifiers 093 such as agent_session_id, tool_invocation_id, capability_token_id, policy_id, request_uuid, or receipt_chain_hash. Audit-bundle generator 180 can assemble related receipts and proofs into audit bundle 084 or into evidence pack 184. Bill-of-materials generator 186 may add a machine-readable bill of materials describing relevant connectors, policy packs, or receipt formats.

Log registrar 142 registers receipts or receipt batches in append-only transparency log 140. Append-only transparency log 140 may return inclusion proof 144, consistency proof 146, a signed-entry acknowledgment, a checkpoint commitment, or combinations thereof. Registration may be immediate, batched, or deferred according to policy and availability mode.

Witness service 148 may co-sign checkpoints or particular receipt registrations. Witness rules can enforce k-of-n thresholds, administrative-domain diversity, geographic diversity, or algorithm diversity. Checkpoints or checkpoint digests can also be anchored to external timestamping or immutable-ledger services so that time-order evidence does not depend on trust in a single operator.

In one non-limiting witness rule, a two-of-three threshold is satisfied only when at least two of the three witnesses are operated by different administrative domains, such that compromise of any one administrative domain is insufficient to satisfy the threshold rule.

Query API 182 can return receipts, proofs, checkpoints, and selected correlation views responsive to a request. Evidence pack 184 may therefore contain both raw receipts and derived supporting materials sufficient for later offline verification.

In some embodiments, evidence pack 184 includes a machine-readable bundle manifest enumerating included receipts, proofs, checkpoints, policy-pack identifiers, profile identifiers, and descriptor digests, and a deterministic bundle_digest is computed over a canonical encoding of the manifest so that independent parties can verify they are evaluating the same bundle.

Because receipt content, shared correlation identifiers 093, hash-link semantics, and log proofs are co-designed, a verifier can distinguish whether a receipt was merely signed, whether it was signed and registered, whether registration satisfied witness requirements, and whether checkpoint anchoring occurred.

The same evidence structures can support operational debugging, incident reconstruction, procurement review, or other assurance workflows without requiring later inference from unrelated log formats.

Verification Profiles and Offline Verification (FIGS. 6 and 12)

Verification rule store 192 stores one or more machine-readable verification profiles. As illustrated in FIG. 12, a verification profile may be expressed as a policy pack or domain-specific rule set defining what evidence is required for a particular deployment, resource class, workflow class, or assurance level.

In one illustrative grammar, a verification profile includes: profile_identifier; profile_version; required_receipt_types; required_control_points; allowed_scope_patterns; maximum_token_age; witness_rule; anchor_rule; disclosure_rule; completeness_rule; algorithm_rule; and escalation_rule. The profile may be represented in canonical JSON, canonical CBOR, or another deterministic format and may itself be signed and hashed.

In one non-limiting example, a canonical JSON representation of a verification profile for a high-risk workflow may take the following form:

```
{
    "profile_identifier": "payments-high-risk-v1",
    "profile_version": 1,
    "required_receipt_types": [
        "delegation",
        "tool_use"
        "promotion",
        "refusal",
```

```
    "consumption",
    "revocation",
    "checkpoint"
  ],
  "required_control_points": [
    "AUTHZ_ISSUE",
    "DESCRIPTOR_VERIFY",
    "OUTPUT_PROMOTION",
    "FINAL_EXECUTION"
  ],
  "maximum_token_age": "300s",
  "witness_rule": { "threshold": "2-of-3" },
  "anchor_rule": { "required_anchor_types": ["timestamping_service", "immutable_ledger"] },
  "disclosure_rule": { "redact_fields": ["tenant_identifier", "resource_identifiers",
"parameter_values"] },
  "completeness_rule": { "min_control_point_coverage": 1.0 },
  "algorithm_rule": {
    "accepted_signature_containers": ["DSSE", "COSE", "JOSE"],
    "accepted_hash_algorithms": ["SHA-256"]
  },
  "escalation_rule": { "on_missing_checkpoint": "HOLD" }
}
```

Independent implementations can generate identical canonical encodings for the same logical profile so long as field ordering and serialization rules are applied consistently.

In some embodiments, a machine-readable verification profile is cryptographically signed and one or both of (i) registered in append-only transparency log 140 so as to be retrievable with inclusion proof 144 and (ii) anchored to an external timestamping service or immutable ledger. Offline verifier 190 can validate the signature of the verification profile and prove inclusion, anchoring, or both, as applicable, of the verification profile before applying the verification profile to evaluate a lineage.

In some embodiments, a verification profile includes a profile_digest computed over a canonical encoding of the profile, and offline verifier 190 validates that the evaluated profile_digest matches a digest bound into the verification bundle or one or more receipts, thereby detecting profile substitution or semantic drift even when a profile identifier is reused.

Required_receipt_types can specify, for example, that a valid lineage for a given workflow must include delegation, tool_use, promotion or refusal, consumption or revocation, and checkpoint evidence. Required_control points can specify that authority issuance, descriptor verification, output-promotion, and final execution must each produce corresponding receipts.

Allowed_scope_patterns can define permissible operations, resource classes, endpoint classes, parameter grammars, and time limits. Maximum_token_age can require that a consumed token not exceed a specified age relative to checkpoint time. Witness_rule can require a threshold number or diversity of witnesses. Anchor_rule can require one or more anchor types for specified risk classes.

Disclosure_rule can specify which fields must be revealed, which may remain committed but undisclosed, and which proof modes are acceptable. Completeness_rule can require that all correlation identifiers resolve to a connected lineage or that a specified percentage of expected control points be present. Escalation_rule can specify whether a missing artifact yields HOLD, FAIL, or a request for supplemental evidence.

Offline verifier 190 reconstructs the lineage by replaying parent-child digest relationships, log proofs, checkpoints, witness signatures, and profile semantics. Shared correlation identifiers 093 and hash links can be used to join receipts using request identifiers, token identifiers, session identifiers, connector invocation identifiers, parent chain hashes, or control-point identifiers.

Offline verifier 190 validates receipt schema, signature-container semantics, trust-root membership using key store 194, inclusion proof 144, consistency proof 146, checkpoint signatures, witness signatures, anchoring artifacts, canonicalization recomputation, temporal conditions, and profile-defined completeness conditions. Offline verifier 190 then emits PASS, HOLD, or FAIL with structured reason codes.

PASS indicates that required artifacts are present and verifiable under the active profile. HOLD indicates that one or more required artifacts are missing, stale, or not yet anchored, but no definitive contradiction has been proven. FAIL indicates that at least one required rule is violated, such as signature invalidity, token expiration, policy mismatch, witness-threshold failure, or context-firewall violation.

Report generator 196 may emit both a human-readable report and a machine-readable result. The machine-readable result may include a result digest so that later systems can reference the verifier output itself as part of a larger lineage or multi-party assurance workflow.

In some embodiments, report generator 196 emits a verifier_result_receipt binding at least a bundle_digest, profile_identifier (and optionally profile_digest), PASS/HOLD/FAIL disposition, reason codes, and verifier identity to a structured signature container, and the verifier_result_receipt may be registered in transparency log 140 or anchored so that downstream parties can reference the verifier output as tamper-evident lineage evidence.

Because a verification profile is itself canonical and versioned, different deployments can apply different rule sets to the same underlying lineage while preserving determinism in offline verification.

In some embodiments, offline verifier 190 or report generator 196 emits a verifier_result_receipt that functions as a decision badge bound to the evaluated verification bundle. The verifier_result_receipt may bind at least a bundle_digest, a profile_identifier and optionally a profile_digest, together with a PASS, HOLD, or FAIL disposition and one or more machine-readable reason codes. The verifier_result_receipt may further bind a verifier_identifier, a verifier public-key identifier, certificate-chain reference, or trust-root reference, and a verifier_result_digest computed over a canonical encoding of the result payload. The verifier_result_receipt may be signed using a structured signature container selected from DSSE, COSE, JOSE, or an equivalent structured signature container, thereby enabling independent parties to validate the result offline without requiring live access to the verifier. In some embodiments, the decision badge includes a badge_identifier, a validity window, and/or a nonce or challenge reference so that a relying party can detect replay or stale reuse of a prior PASS result for a different execution context. In some embodiments, the verifier_result_receipt additionally binds a verifier_build_digest, attestation measurement, or rule-engine identifier and version, thereby enabling detection of spoofed verifier software or downgraded verifier semantics.

In some embodiments, one or more decision badges or verifier_result_receipts are registered in append-only transparency log 140 or maintained in a badge registry backed by append-only transparency log 140. The badge registry may enable retrieval of a verifier_result_receipt together with an inclusion proof, a consistency proof, or a checkpoint commitment, and may support revocation, supersession, dispute markers, or equivocation markers for badges later determined to be invalid, incomplete, or inconsistent. In some embodiments, the badge registry enforces audience binding by associating a badge with an audience identifier or disclosure policy so that a verifier_result_receipt can be validated for authenticity while limiting unnecessary disclosure. A later reviewer can therefore distinguish a mere assertion of compliance from a log-proved and, where applicable, witness-backed decision badge tied to a specific bundle_digest and profile_digest. In some embodiments, the badge registry provides signed checkpoint commitments and consistency proofs across successive checkpoints, enabling detection of equivocation or split-view behavior by a registry operator. In some embodiments, checkpoint commitments are co-signed by witnesses and/or published to multiple independent transparency logs, and verifiers may compare checkpoints (gossip) to detect inconsistent histories.

In some embodiments, a policy-consumer rail enforces admit-before-fulfillment semantics by requiring a valid decision badge as a condition for allowing promotion to EXECUTABLE_PARAMETER or PRIVILEGED_INSTRUCTION state, or as a condition for permitting execution against a protected resource. The policy-consumer rail may be implemented at a gateway, service mesh, connector sandbox, operating-system hook, policy enforcement point, or protected resource endpoint, and may validate at least the badge signature, badge freshness or validity window, audience binding, inclusion or checkpoint evidence where required by a verification profile, and, in some embodiments, one-time-consumption or nonce-binding state to resist replay or cross-audience reuse of a badge. If badge validation fails, is missing, is stale, is replayed, or is inconsistent with a pinned profile_digest or policy_pack_digest, the policy-consumer rail can deterministically yield HOLD or FAIL (and, in some embodiments, enforce-time DENY) and can cause emission of a refusal receipt with a reason code indicating badge invalidity, badge absence, profile mismatch, replay suspicion, or checkpoint incompleteness. In this way, action is conditioned on proof, and an unverifiable path deterministically routes to HOLD or FAIL rather than silent allowance.

In some embodiments, verification profiles and policy packs are distributed as signed artifacts and are pinned by digest to prevent semantic drift, downgrade, or rollback. For example, a verification bundle may bind a profile_digest and/or a policy_pack_digest, and a policy-consumer rail may require that the presented decision badge and underlying receipts correspond to the pinned digests rather than merely matching a human-readable identifier string. Where a profile or policy pack is updated, the architecture may emit a rotation receipt binding prior trust state, new trust state, an effective time window, and checkpoint references, thereby enabling later proof of which rule semantics were in force at each control point. Where an unknown critical extension is encountered in a profile, policy pack, or receipt, the architecture and offline verifier 190 may treat the condition as HOLD or FAIL under the active profile, thereby preventing silent weakening of enforcement during version skew or attempted rollback. In some embodiments, pinning includes enforcing a monotonic upgrade rule, including a minimum profile_version, minimum profile_digest set, and/or minimum checkpoint time, so that older profiles or policy packs cannot be replayed after a superseding update without producing a HOLD or FAIL outcome. In some embodiments, the architecture emits a supersession or revocation receipt for profiles and policy packs and binds those receipts to checkpoints, enabling later verifiers to detect rollback even when an identifier string is reused or a registry attempts to serve an older artifact.

Selective Disclosure and Privacy-Preserving Modes (FIG. 8)

As illustrated in FIG. 8, audit bundle 084 may disclose only a subset of receipt fields while still binding undisclosed fields to the same underlying receipt digest. A selective-disclosure engine can represent one or more receipt fields as commitments rather than disclosed values.

In a Merkle-subtree embodiment, a receipt payload is represented as leaves of a Merkle tree. The receipt digest can commit to the Merkle root, and a selective-disclosure package can reveal a subset of leaves together with authentication paths sufficient to prove that the disclosed subset is part of the committed receipt payload.

An audience-bound pseudonymous identifier can be derived so that the same subject is represented differently to different verifiers. For example, pseudonymous_subject_id may equal H("SIDv1"‖tenant_salt‖subject_identifier‖audience_identifier). A trusted internal verifier may still map the pseudonymous identifier back to the original subject where authorized.

A privacy-proof adapter may support zero-knowledge or proof-placeholder constructions that prove satisfaction of a rule without disclosing a field value. Examples include proving that a token age is below a threshold, that a parameter value lies within an allowed range, or that a disclosed subset corresponds to a committed superset. The present disclosure is not limited to any particular proof system.

Selective disclosure can be integrated with verification profiles. For example, a profile for procurement review may require evidence of descriptor verification, witness threshold, and revocation completeness while permitting redaction of tenant identifiers and parameter values. A profile for incident response may require broader disclosure.

By binding disclosure modes into the same canonical lineage, the architecture allows different audiences to verify the same underlying event history while receiving different disclosed subsets of data.

Outage Handling, Federation, and Witness Ecosystem (FIG. 13)

When one or more services such as append-only transparency log 140 or witness service 148 are unavailable or degraded, the architecture can enter a controlled degraded mode that is itself recorded and later verifiable.

In one embodiment, a producer emits a provisional local receipt that is signed locally and stored in a durable queue together with a local monotonic sequence value, a local time estimate, and a deferred-registration flag. Once connectivity is restored, receipts can be registered through compliance receipt exchange service 170 or directly through log registrar 142, and a reconciliation receipt can link the provisional local receipt to the registered receipt.

A verification profile may specify whether provisional local receipts are sufficient for temporary PASS, temporary HOLD, or temporary DENY outcomes for particular risk classes. For example, low-risk read operations may proceed with HOLD-verifiable local receipts, whereas high-risk write operations may require witness-backed checkpoint evidence before final ALLOW.

Clock-skew handling can use trusted checkpoint time, secure time sources, or bounded-skew assumptions. A reconciliation receipt may record corrected time, estimated uncertainty bounds, and whether any time-related rule was evaluated conservatively during the outage period.

The availability mode therefore becomes part of the technical architecture rather than an out-of-band exception process. This is important because later verifiers can determine exactly what evidence was available at execution time and what evidence was supplied only after restoration.

Federation and Third-Party Receipt Producers (FIG. 13)

In some embodiments, integrated control architecture 100 operates across multiple tenants, multiple organizations, or both. A federation trust bundle may include trust roots, accepted signature-container types, witness policies, checkpoint anchors, profile identifiers, and descriptor trust roots for a federation or for a bilateral relationship among organizations.

A verifier can validate a mixed lineage containing receipts produced by multiple organizations without assuming a single global operator. Tenant-local identifiers can be mapped to cross-organization identifiers subject to disclosure rules and profile requirements.

Third-party receipts may be received from auditors, regulators, customer-side monitors, policy evaluators, or independent measurement systems and linked into the same lineage via correlation identifiers, parent digests, or control-point references.

In one example, a customer-side monitor verifies that a connector call originated from an expected network identity and emits an observation receipt. In another example, a regulator-side monitor emits a compliance-observation receipt tied to a public checkpoint. The architecture can correlate these external receipts with internal receipts without merging all trust into a single authority.

Federated operation allows different organizations to deploy different components while remaining interoperable through shared canonicalization, receipt, control-point, and verification-profile semantics.

Illustrative Technical Scenarios

In a malicious connector-descriptor substitution scenario, an attacker replaces a legitimate connector descriptor with a descriptor that points to a different endpoint and declares broader permissions. Connector descriptor resolver 152 obtains the substituted descriptor, but integrity verifier 156 detects failure of the signature chain, mismatch of the build fingerprint, revocation of the descriptor signer, mismatch of endpoint pinning, or inconsistency of the software bill of materials digest. Connector trust mediation system 150 therefore refuses invocation and emits refusal receipt 136 tied to the failed control point. Because the refusal is part of the lineage, later review can distinguish a blocked attempt from a silent system outage.

In a tool-output prompt-injection scenario, a legitimate connector returns tool output 164 containing both a structured data field and free text instructing the agent to ignore existing policy and perform an unrelated action. Context firewall 166 separates the structured field from the free text. The structured field can be marked as CANDIDATE_PARAMETER and the free text as UNTRUSTED_DATA. The free text is prevented from entering the privileged-instruction channel. Only the structured field can be considered for promotion, and only if its schema, provenance, and scope constraints are satisfied.

In a signed-receipt correlation scenario, a connector returns tool output 164 in which each field is individually well-formed and tool-use receipt 168 is validly signed, but a combination of fields is intended to cause a downstream agent to act outside the derived invocation scope. For example, the connector may return an informational-note field that embeds a secondary identifier that, if copied into an instruction channel or treated as an executable parameter, would authorize access to an unrelated resource. Context firewall 166 tags the informational-note field as UNTRUSTED_DATA because the field is not allowlisted as an executable parameter by connector descriptor 154 and is not permitted by the invocation scope. The promotion gate therefore refuses to promote the smuggled content to EXECUTABLE_PARAMETER or PRIVILEGED_INSTRUCTION state despite the valid receipt signature and tool-output digest binding, and receipt generator 130 emits refusal receipt 136 with reason codes such as CONTEXT_FIREWALL_VIOLATION and PROVENANCE_MISSING. A later offline verifier 190 can distinguish this deliberate correlation attempt from a benign signed notification by replaying the refusal control point and applicable rule identifiers.

In a cascading-revocation scenario, a parent capability token 122 authorizing a session is revoked while multiple child tokens remain active. Revocation propagator 128 traverses delegation graph store 126, issues revocation receipts 137, invalidates directly dependent child tokens, and recomputes residual authority for descendants with multiple parents. An in-flight connector call that attempts token consumption after the revocation may receive HOLD or DENY depending on whether it can present a fresh checkpoint or updated revocation evidence.

In a delayed-registration scenario, a connector call executes during temporary loss of connectivity to append-only transparency log 140. A provisional local tool-use receipt is emitted and later reconciled when connectivity returns. An offline verifier 190 using a profile that permits degraded-mode read actions can output PASS after reconciliation if all queued receipts, sequence values, and time bounds verify correctly.

In a selective-disclosure scenario, a procurement reviewer needs proof that high-risk actions used connectors with valid descriptors, witness-backed checkpoints, and revocation completeness, but does not require disclosure of exact resource names. The architecture provides committed resource identifiers and proof that the undisclosed identifiers remain bound to the verified receipts. The reviewer can verify policy satisfaction without access to the full identifiers.

In a multi-tenant scenario, an enterprise parent tenant delegates a narrow capability to a subsidiary tenant through a federated trust bundle. The subsidiary tenant uses its own connector trust mediation system 150 and emits local receipts. The parent tenant later reconstructs lineage by correlating the federated delegation receipt, the subsidiary tool-use receipt 168, and shared checkpoint evidence.

In a live-human escalation scenario, a profile requires human approval before promotion of certain monetary parameters above a threshold. Context firewall 166 therefore routes a high-value parameter from CANDIDATE_PARAMETER to HOLD PENDING APPROVAL rather than EXECUTABLE_PARAMETER. A human approval receipt can then be added as another linked receipt before final promotion or refusal.

In a verifier-mismatch scenario, offline verifier 190 receives a receipt containing an unknown critical extension introduced by a later system version. Because the extension is marked critical, offline verifier 190 outputs HOLD or FAIL according to the active profile rather than silently ignoring the field. This protects interoperability while preventing false PASS outcomes during version skew.

These scenarios illustrate that the disclosed architecture is not limited to a single attack type or assurance use case. The common thread is that authority, descriptor trust, output-promotion control, and proof verification remain coupled through the same canonical lineage.

End-to-End Operation Flow and Technical Effects (FIG. 9)

FIG. 9 summarizes an example end-to-end operation flow in which request interface 112 receives an action request, identity credential validator 116 validates an identity credential, policy engine and risk scoring engine 118 together with temporal constraint module 124 derive scope and time bounds, capability token issuer 120 issues capability token 122 and receipt generator 130 emits delegation receipt 132, connector descriptor resolver 152 and scope-derivation engine 158 verify connector descriptor 154 and derive invocation scope, connector call executor 160 invokes the connector and context firewall 166 constrains use of tool output 164, cryptographically linked receipts including tool-use receipt 168 and consumption receipt 134 or refusal receipt 136 are registered in append-only transparency log 140, compliance receipt exchange service 170 builds evidence pack 184, and offline verifier 190 emits a PASS, HOLD, or FAIL result through report generator 196.

The disclosed architecture yields technical effects including deterministic recomputation of digests across independently implemented systems, bounded offline proof replay using checkpoint and inclusion data, reduced replay acceptance through freshness binding and revocation-cache coordination, and constrained execution paths for tool output through explicit control-plane and data-plane separation.

In Merkle-tree embodiments, inclusion-proof size and verification work scale logarithmically with the number of registered receipts. For example, for n registered receipts, a membership proof can be verified using on the order of $O(\log 2\,n)$ hash operations, so that even a log containing millions of receipts yields proofs comprising only tens of hash steps for an offline verifier. In delegation-graph embodiments with configured maximum depth and fan-out, worst-case revocation traversal can be bounded by those configured limits, allowing operators to set an explicit upper bound on revocation work by choosing depth and fan-out parameters. In selective-disclosure embodiments, disclosed proof payload size can be smaller than the full receipt payload while remaining bound to the same receipt digest.

The architecture may be implemented in software, hardware, firmware, trusted execution environments, distributed services, or combinations thereof. Components may be co-located or distributed. A single service may implement multiple logical components, or a single logical component may be divided among multiple services.

APPENDICES

The following appendices provide non-limiting illustrative terminology, data structures, and examples that may be used in any combination with the embodiments described above, and are not required in all embodiments.

Appendix A—Glossary

"Action lineage" refers to the ordered and cryptographically linked relationship among request, delegation, invocation, promotion, refusal, revocation, outcome, and verification events associated with a requested operation.

"Capability scope" refers to a normalized set of permissions, constraints, and limits derived for an action request and bound to a verified identity and request digest.

"Connector descriptor" refers to a cryptographically verifiable record describing a connector runtime, declared permissions, version or build state, endpoint or sandbox properties, and related trust metadata.

"Control point" refers to a defined decision or enforcement point at which the architecture determines whether a request, output segment, or proof state may progress to a more privileged state.

"Context firewall" refers to a subsystem that separates instruction and tool-output channels and controls data-plane to control-plane promotion through explicit verification rules.

"Lineage hash" refers to a digest derived from a receipt digest together with one or more parent lineage hashes or parent receipt digests to represent position in a lineage.

"Verification profile" refers to a machine-readable rule set that specifies what evidence, proofs, control points, and disclosure conditions are required for a PASS, HOLD, or FAIL determination.

"Witness threshold" refers to a rule requiring at least a specified number or diversity of witness signatures or attestations before a receipt registration or checkpoint is treated as sufficient for a defined purpose.

"Invocation scope" refers to a least-privilege scope derived for a connector call as a constrained function of capability scope, descriptor-declared permissions, and policy constraints, and may include operation limits, resource patterns, endpoint classes, parameter grammars, and time bounds.

"Promotion receipt" refers to a cryptographically verifiable receipt that attests that a specific typed segment was promoted at a specified control point under a specified rule set, and may bind segment digest, provenance fields, and applicable policy or profile identifiers.

"Provisional local receipt" refers to a receipt emitted during temporary unavailability of a transparency log, and may include a deferred-registration indicator and uncertainty bounds.

"Reconciliation receipt" refers to a receipt that links a provisional local receipt to a registered receipt after restoration, and may include corrected time, sequence evidence, and verification outcomes under a profile.

"Verification bundle" refers to a package comprising receipts, proofs, checkpoints, keys or trust roots, and one or more verification profiles sufficient for offline verification of lineage.

"Policy pack digest" refers to a digest computed over a canonical encoding of a signed policy pack used to derive scope, time bounds, or promotion constraints.

"Profile digest" refers to a digest computed over a canonical encoding of a verification profile, optionally together with a compiler or interpreter identifier and version.

"Evidence pack" refers to a verification bundle formatted for third-party review, including procurement-grade packaging and, in some embodiments, a bundle manifest and bill-of-materials information.

"Observation receipt" refers to a cryptographically verifiable receipt that attests to an observed signal, posture change, discovery event, or policy-relevant external fact that can trigger re-evaluation, narrowing, suspension, or revocation.

"Lifecycle receipt" refers to a cryptographically verifiable receipt that attests to provisioning, rotation, suspension, decommissioning, or inventory state of a non-human identity, delegated grant, or connector runtime.

"Receipt" refers to a cryptographically verifiable record of an event, decision, or state transition, and may include a canonical payload encoding, a receipt digest, signature-container metadata, correlation identifiers, and one or more parent digests or lineage hashes.

"Checkpoint" refers to a commitment, signed entry, or state marker representing a verifiable position in a transparency-log history or lineage, and may be co-signed by one or more witnesses and/or anchored to an external timestamping or immutable-ledger service.

"Bundle manifest" refers to a machine-readable inventory of artifacts included in a verification bundle or evidence pack, including identifiers or digests of receipts, proofs, checkpoints, policies, profiles, and descriptors.

"Bundle digest" refers to a digest computed over a canonical encoding of a bundle manifest, thereby enabling independent parties to verify that they are evaluating the same verification bundle or evidence pack.

"Policy trace digest" refers to a digest or commitment computed over a policy-evaluation trace, activated rule identifiers, or constraint-set identifiers, and may support selective disclosure of policy evaluation semantics without disclosing underlying values.

"Rotation receipt" refers to a cryptographically verifiable receipt that attests to a change in trust configuration, including a trust-root update, signer-key rotation, or algorithm transition, and may bind prior trust state, new trust state, an effective time window, and checkpoint references.

"Action request" refers to a structured or semi-structured request that identifies an intended operation, a target resource, and associated context, and may include parameters, workflow identifiers, or correlation identifiers.

"Request digest" refers to a digest computed over a canonical encoding of selected request fields under a domain-separated hashing rule.

"Canonical encoding" refers to a deterministic serialization that yields identical byte strings for identical logical content across independent implementations, and may include canonical JSON, canonical CBOR, or a deterministic tag-length-value form.

"Canonicalization rule" refers to one or more deterministic rules that specify mandatory field order, optional-field handling, null markers or omission markers, extension ordering, and encoding versioning for canonical encoding.

"Domain-separated hash" refers to a hashing construction in which a context label, prefix, or domain separator is included to reduce cross-context ambiguity among digests computed for different artifact types.

"Critical extension" refers to an extension field marked such that an unrecognized instance is treated as a HOLD or FAIL condition under a verification profile rather than silently ignored.

"Non-critical extension" refers to an extension field marked such that an unrecognized instance may be ignored under a verification profile while preserving digest chaining and lineage integrity.

"Append-only transparency log" refers to a tamper-evident structure supporting inclusion and history-extension proofs, including Merkle-tree logs, hash-chain logs, verifiable maps, or hybrid constructions.

"Inclusion proof" refers to a proof that an artifact is included in a committed log state.

"Consistency proof" refers to a proof that a later log state is an append-only extension of an earlier log state.

"Checkpoint commitment" refers to a signed or otherwise committed representation of a log state or lineage position that may be witness co-signed and/or externally anchored.

"Checkpoint anchor" refers to an external anchoring artifact or reference that provides time-order or immutability evidence for a checkpoint commitment, including an external timestamping service or immutable ledger.

"Idempotency key" refers to a duplicate-suppression identifier used to detect replays or resubmissions and to enforce consistent receipt issuance for equivalent requests.

"Freshness proof" refers to evidence used to establish recency or non-replay of proof of possession, including evidence based on a nonce, monotonic counter, replay cache state, signed timestamp, or combinations thereof.

"Ephemeral access credential" refers to a short-lived credential restricted to an invocation scope and temporal constraints, and may be audience-bound to a connector, endpoint, or sandbox class.

"Connector descriptor digest" refers to a digest computed over a canonical encoding of a connector descriptor, thereby enabling detection of descriptor substitution, downgrade, or tampering.

"Tool-output digest" refers to a digest computed over a canonical encoding of tool output or selected tool-output fields, thereby enabling later verification of output integrity and promotion decisions.

"Trust-state tag" refers to a label assigned to a typed segment or output element indicating a trust category used to control storage, routing, and promotion eligibility across data-plane and control-plane boundaries.

"Promotion rule" refers to one or more machine-evaluable predicates that must be satisfied before a typed segment can transition to a more privileged state, including predicates for schema conformance, provenance validation, digest matching, policy approval, and control-point requirements.

"Verification rule" refers to one or more machine-evaluable predicates applied at a control point to permit, deny, or hold a transition of a request, token, scope, proof state, or output segment.

"DENY disposition" refers to an enforcement-time refusal outcome in which execution is prevented and a refusal receipt may be emitted; in some embodiments, a DENY disposition may correspond semantically to a FAIL result under a verification profile.

"Verifier result receipt" refers to a cryptographically verifiable receipt emitted by a verifier and binding at least a verification-bundle digest, a profile identifier and/or profile digest, a verifier disposition, one or more reason codes, and verifier identity or trust-reference information.

"Decision badge" refers to a machine-verifiable representation of a PASS, HOLD, or FAIL determination for a verification bundle under a verification profile, and may be represented as a signed verifier result receipt bound to a bundle digest and profile digest.

"Badge registry" refers to a store or transparency-log-backed index that enables retrieval, proof of inclusion, revocation status checks, or auditing for one or more decision badges or verifier result receipts.

"Policy-consumer rail" refers to a downstream enforcement path that requires a valid decision badge, verification-profile digest pinning, or both, as a condition for permitting an operation, promotion, or execution against a protected resource.

Appendix B—Exemplary Receipt and Descriptor Fields

An exemplary receipt may include one or more of: receipt_type, encoding_version, receipt_identifier, producer_identifier, tenant_identifier, subject_identifier, request_identifier, token_identifier, session_identifier, connector_identifier, connector_descriptor_digest, invocation_scope_digest, policy_identifier, profile_identifier, control_point_identifier, time fields, parent digests, lineage hash, payload digest, signature container metadata, witness metadata, checkpoint reference, disclosure metadata, reason codes, policy_pack_identifier, policy_pack_digest, policy_trace_digest, profile_digest, bundle_manifest, bundle_digest, verifier_identifier, verifier_result_disposition, verifier_result_digest, and extension map.

An exemplary connector descriptor may include one or more of: descriptor_identifier, connector_identifier, version identifier, build fingerprint, signer identifier, trust-root identifier, validity window, revocation pointer, declared permissions, action classes, resource patterns, parameter grammar identifiers, endpoint identifiers, network egress limits, sandbox class, attestation measurements, software bill of materials digest, output schema identifiers, output_field_allowlist, promotion_policy_identifier, and cross-tenant isolation markers.

Appendix C—Exemplary Verification-Profile Syntax

In one non-limiting syntax, a verification profile contains fields or clauses corresponding to: profile_identifier; profile_version; required_receipt_types; required_control_points; allowed_scope_patterns; maximum_token_age; maximum_descriptor_age; required_witness_threshold; required_anchor_types; accepted_signature_containers; accepted_hash_algorithms; disclosure_rules; completeness_rules; escalation_rules; and reason_code_mappings.

A profile can specify different requirements for different risk classes, connector classes, resource classes, or workflow classes. A profile can also identify a profile compiler or interpreter version so that later verifiers can confirm which rule engine semantics were intended.

In some embodiments, a profile additionally includes a profile_digest and, where applicable, a compiler or interpreter identifier and version, and the profile_digest may be registered in transparency log 140 or anchored to support independent offline proof of intended rule semantics.

Appendix D—Exemplary Reason Codes

Exemplary reason codes may include: EVIDENCE_MISSING, SIG_INVALID, SCHEMA_INVALID, HASH_ALGORITHM_UNSUPPORTED, UNKNOWN_CRITICAL_EXTENSION, TOKEN_EXPIRED, TOKEN_REVOKED, REPLAY_SUSPECTED, DESCRIPTOR_UNTRUSTED, DESCRIPTOR_REVOKED, ENDPOINT_PIN_MISMATCH, OUTPUT_DIGEST_MISMATCH, PARAMETER_SCHEMA_INVALID, PROVENANCE_MISSING, CONTEXT_FIREWALL_VIOLATION, WITNESS_THRESHOLD_NOT_MET, ANCHOR_MISSING, CONTROL_POINT_MISSING, POLICY_MISMATCH, and PARTIAL_SCOPE_REVOKED.

Appendix E—Exemplary Control-Point Taxonomy and Coverage Matrix

Exemplary control_point_identifier values include, without limitation: AUTHZ_ISSUE, AUTHZ_CONSUME, DESCRIPTOR_RESOLVE, DESCRIPTOR_VERIFY, SCOPE_DERIVE, OUTPUT_PARSE, OUTPUT_PROMOTION, FINAL_EXECUTION, CHECKPOINT, BUNDLE_EXPORT, and VERIFIER_REPORT.

In one non-limiting mapping, required_control_points are paired to required_receipt_types such that AUTHZ_ISSUE corresponds to delegation receipts, DESCRIPTOR_VERIFY corresponds to descriptor-verification evidence in tool-use receipts, OUTPUT_PROMOTION corresponds to promotion or refusal receipts, FINAL_EXECUTION corresponds to consumption receipts, and VERIFIER_REPORT corresponds to verifier results, and completeness_rule may require a configured coverage threshold over the mapping.

Appendix F—Exemplary Bundle Manifest and Bundle-Digest Canonicalization

In some embodiments, evidence pack 184 or verification bundle comprises a machine-readable bundle manifest enumerating included receipts, proofs, checkpoints, policy-pack identifiers, profile identifiers, and connector-descriptor digests, and a bundle_digest is computed over a canonical encoding of the manifest so that independent parties can verify they are evaluating the same bundle.

In one non-limiting example, a canonical JSON bundle manifest may take the following form:

```
{
  "manifest_identifier": "bundle-<uuid>",
  "manifest_version": 1,
  "created_time": "<rfc3339>".
  "receipts": [
    {
      "receipt_identifier": "<id>", "receipt_type": "delegation",
      "receipt_digest": "<hex>", "control_point": "AUTHZ_ISSUE"
    }
  ],
  "proofs": [
    { "proof_type": "checkpoint", "checkpoint_digest": "<hex>",
```

-continued

```
    "witness_threshold": "2-of-3" }
  ],
  "descriptors": [
    { "connector_identifier": "<cid>", "connector_descriptor_digest": "<hex>" }
  ],
  "policy_packs": [ { "policy_pack_identifier": "<pid>", "policy_pack_digest": "<hex>" } ],
  "profiles": [ { "profile_identifier": "<prof>", "profile_digest": "<hex>" } ],
  "bundle_extensions": { "critical": [ ], "non_critical": [ ] }
}
bundle_digest = H("BNDLv1" || canonical_manifest_encoding)
```

Appendix G—Exemplary Signed Policy Pack and Policy Pack Digest

In some embodiments, one or more policy constraints used to derive capability scope, invocation scope, or output-promotion constraints are expressed in a signed policy pack that is canonicalized and hashed to form a policy_pack_digest, thereby enabling offline verifiers to detect policy-pack substitution even when a policy identifier string is reused.

In one non-limiting example, a signed policy pack may take the following form:

```
{
  "policy_pack_identifier": "policy-pack-<uuid>",
  "policy_pack_version": 1,
  "issued_time": "<rfc3339>",
  "scope_rules": [
    { "rule_id": "R1", "action_classes": ["read"],
      "resource_patterns": ["/finance/*"] }
  ],
  "promotion_constraints": {
    "allowed_output_fields": ["amount", "date", "currency"],
    "parameter_grammar_identifier": "payment-params-v1"
  },
  "control_point_requirements": [
    "AUTHZ_ISSUE", "DESCRIPTOR_VERIFY", "OUTPUT_PROMOTION",
"FINAL_EXECUTION"
  ],
  "policy_extensions": { "critical": [ ], "non_critical": [ ] },
  "signature_container": {
    "type": "DSSE",
    "signatures": [ { "key_id": "<kid>", "sig": "<b64>" } ]
  }
}
policy_pack_digest = H("POLICYv1" || canonical_policy_pack_encoding)
```

Appendix H—Exemplary Connector Descriptor Extensions for Output Promotion Control In some embodiments, a connector descriptor includes extensions constraining which output fields are eligible for promotion, which parameter grammars apply to promoted fields, and which promotion policy identifiers govern data-plane to control-plane transitions, thereby increasing resistance to output smuggling and design-around attempts.

In one non-limiting example, a connector descriptor with output-promotion extensions may take the following form:

```
{
  "descriptor_identifier": "connector-desc-<uuid>",
  "connector_identifier": "payments-connector",
  "build_fingerprint": "<hash>",
  "declared_permissions": {
    "action_classes": ["charge"],
    "resource_patterns": ["merchant/*"]
  },
  "output_field_allowlist": ["amount", "currency", "merchant_id", "receipt_handle"],
  "parameter_grammar_identifiers": ["payment-params-v1", "currency-iso4217"],
```

-continued

```
"promotion_policy_identifier": "promo-policy-v2",
"output_schema_identifiers": ["payments.output.v1"],
"context_injection_constraints": {
    "allowed_object_classes": ["invoice_pdf"],
    "allowed_provenance": ["signed_attachment"]
},
"attestation_measurements": ["<pcr0>","<pcr1>"],
"signature_container": { "type": "COSE", "sig": "<b64>" }
}
```

Non-Limiting Interpretation

The embodiments described herein are illustrative and not restrictive. Features described in connection with one embodiment may be combined with features of other embodiments unless such combination is expressly incompatible.

Steps, control points, and receipt emissions may be reordered, parallelized, partitioned across services, or combined into fewer components, without departing from the disclosed lineage-binding principles.

Receipts may be emitted per-event, in batches, or as streams, and correlation may be performed incrementally or retrospectively while preserving canonical digest relationships.

Transparency logs may be public, private, consortium-operated, or federated, and witness and anchoring mechanisms may vary while still providing inclusion, consistency, checkpoint, and time-order evidence for offline verification.

The scope of protection is defined by the claims, including equivalents.

The invention claimed is:

1. A computer-implemented control architecture for agentic operations against protected resources, comprising:

one or more processors; and memory storing instructions that, when executed by the one or more processors, cause the control architecture to:

(a) receive an action request from an agent, the action request identifying at least a requested operation, a target resource, and request context;

(b) verify an identity credential bound to an agent-held cryptographic key to obtain a verified identity credential and validate freshness of proof of possession using at least one of a nonce, a monotonic counter, or a replay cache;

(c) canonicalize selected fields of the action request according to a deterministic encoding rule and compute a request digest using a domain-separated hash;

(d) determine, under at least one policy, a capability scope and one or more temporal constraints for the action request;

(e) issue a capability token cryptographically bound to the verified identity credential, the request digest, the capability scope, and the one or more temporal constraints;

(f) verify a connector descriptor for a connector exposing a tool capable of carrying out the requested operation, including validating a cryptographic integrity assertion for the connector descriptor;

(g) derive an invocation scope for the tool as a constrained function of the capability scope, permissions declared in the connector descriptor, and one or more policy constraints;

(h) execute, using an ephemeral access credential limited to the invocation scope, a connector call to obtain tool output;

(i) apply a context firewall that stores instruction input and the tool output in separate channels and blocks promotion of the tool output into a privileged instruction or executable parameter absent satisfaction of a verification rule;

(j) generate a plurality of cryptographically linked receipts comprising at least a delegation receipt for issuance of the capability token, a tool-use receipt for the connector call, and at least one of a consumption receipt, a refusal receipt, a promotion receipt, or a revocation receipt;

(k) register the plurality of cryptographically linked receipts in an append-only transparency log and obtain at least one of an inclusion proof, a consistency proof, or a checkpoint commitment for the plurality of cryptographically linked receipts; and (l) provide a verification bundle usable by an offline verifier to reconstruct lineage from the action request through the connector call and to verify the proofs without requiring online access to a receipt producer.

2. The control architecture of claim 1, wherein canonicalizing comprises encoding mandatory fields in a fixed order, encoding optional fields with explicit null markers or omission markers according to a canonicalization rule, ordering extension fields deterministically, and including an idempotency key and a critical-extension indicator in at least one of the action request or the plurality of cryptographically linked receipts.

3. The control architecture of claim 1, wherein validating freshness comprises checking a nonce signed or attested over at least a portion of the action request, checking a monotonic counter against stored state, invalidating stored freshness state responsive to revocation, and outputting a refusal receipt when freshness cannot be established within an allowed uncertainty window.

4. The control architecture of claim 1, wherein determining the capability scope and the one or more temporal constraints further comprises computing or retrieving a risk score based on at least one of target-resource sensitivity, connector trust level, anomaly indicators, or recent refusal history, and tightening at least one scope dimension or temporal limit responsive to the risk score.

5. The control architecture of claim 1, wherein the instructions further cause the control architecture to maintain a delegation graph recording parent-child relationships among capability tokens or sessions and, responsive to a revocation event, traverse the delegation graph to perform at least one of subtree invalidation, partial-scope revocation, stale-proof detection, or downstream receipt generation.

6. The control architecture of claim 1, wherein registering the plurality of cryptographically linked receipts further comprises obtaining one or more witness co-signatures satisfying a threshold rule and anchoring at least one checkpoint commitment to an external timestamping service or immutable ledger.

7. The control architecture of claim 6, wherein the threshold rule requires two-of-three witness co-signatures, and wherein at least two of the three witnesses are operated by different administrative domains such that compromise of any one administrative domain is insufficient to satisfy the threshold rule.

8. The control architecture of claim 1, wherein the verification bundle comprises selectively disclosed fields, a commitment or proof showing that one or more undisclosed fields remain bound to a disclosed receipt digest, and an audience-bound pseudonymous identifier for at least one subject identifier.

9. The control architecture of claim 1, wherein, responsive to temporary unavailability of the append-only transparency log, the instructions further cause the control architecture to issue a provisional local receipt with a deferred-registration indicator, later register the provisional local receipt upon restoration of log connectivity, and emit a reconciliation receipt linking the provisional local receipt to a registered receipt.

10. The control architecture of claim 1, wherein one or more of the delegation receipt, the tool-use receipt, the consumption receipt, the refusal receipt, the promotion receipt, or the revocation receipt are signed using a structured signature container selected from: a Dead Simple Signing Envelope (DSSE), a CBOR Object Signing and Encryption (COSE) structure, or a JSON Object Signing and Encryption (JOSE) structure.

11. A computer-implemented context-firewall subsystem for an agentic control architecture that uses linked receipts in an append-only transparency log, comprising:

one or more processors; and memory storing instructions that, when executed by the one or more processors, cause the context-firewall subsystem to:

(a) receive instruction data over a control-plane instruction channel and tool output over a data-plane tool-output channel;

(b) parse the tool output into typed segments and assign each typed segment one of a plurality of trust-state tags comprising UNTRUSTED_DATA, CANDIDATE_PARAMETER, VERIFIED_EVIDENCE, EXECUTABLE_PARAMETER, PRIVILEGED_INSTRUCTION, or BLOCKED_CONTENT;

(c) store typed segments associated with different trust-state tags in different queues, buffers, or memory regions;

(d) apply one or more promotion rules that require schema conformance, provenance validation, digest matching, and policy approval before a typed segment can move from UNTRUSTED_DATA or CANDIDATE_PARAMETER state to EXECUTABLE_PARAMETER or PRIVILEGED_INSTRUCTION state;

(e) block direct execution of a typed segment that fails the one or more promotion rules and emit a refusal receipt including a reason code; and (f) emit a promotion receipt or a tool-use receipt for a typed segment that satisfies the one or more promotion rules, such that later offline verification can determine whether tool output affected execution only through an approved control point.

12. The context-firewall subsystem of claim 11, wherein the instructions further cause the context-firewall subsystem to maintain separate parsing, storage, or retrieval paths for the control-plane instruction channel and the data-plane tool-output channel such that natural-language content from the data-plane tool-output channel cannot be inserted into a policy buffer or system-instruction buffer without passing through a promotion rule.

13. The context-firewall subsystem of claim 11, wherein the one or more promotion rules require that a typed segment correspond to an allowlisted output field declared in a verified connector descriptor for a connector that produced the tool output, conform to an allowlisted parameter grammar, and satisfy a control-point policy before the typed segment is promoted to EXECUTABLE_PARAMETER state.

14. The context-firewall subsystem of claim 11, wherein the instructions further cause the context-firewall subsystem to record, in the refusal receipt or the promotion receipt, a control-point identifier and a segment digest that enables a later verifier to determine whether a blocked or promoted typed segment originated from a verified connector output.

15. A computer-implemented method for verifiable agentic execution against a protected resource, the method comprising:

receiving an action request from an agent;

verifying an identity credential bound to an agent-held cryptographic key to obtain a verified identity credential and validating proof-of-possession freshness;

canonicalizing selected request fields and computing a request digest using a domain-separated hash;

deriving, under at least one policy, a capability scope and one or more temporal constraints for the action request;

issuing a capability token cryptographically bound to the verified identity credential, the request digest, the capability scope, and the one or more temporal constraints;

verifying a connector descriptor for a connector selected to carry out at least a portion of the action request;

deriving an invocation scope as a constrained function of the capability scope, permissions declared in the connector descriptor, and policy constraints;

executing a connector call under an ephemeral access credential restricted to the invocation scope to obtain tool output;

applying a context firewall that prevents the tool output from becoming privileged instruction or executable parameter data absent satisfaction of a verification rule at a control point;

generating cryptographically linked receipts that include at least a delegation receipt, a tool-use receipt, and one or more of a consumption receipt, a refusal receipt, a promotion receipt, or a revocation receipt;

registering the cryptographically linked receipts in an append-only transparency log; and offline verifying, using a verification bundle comprising at least the cryptographically linked receipts and one or more proofs obtained from the append-only transparency log, whether the action request was processed in accordance with the at least one policy.

16. The method of claim 15, wherein offline verifying comprises loading a machine-readable verification profile that specifies required receipt types, required control points, at least one witness threshold, at least one disclosure rule, and at least one completeness rule, and outputting a PASS, HOLD, or FAIL disposition responsive thereto.

17. The method of claim 16, wherein the machine-readable verification profile is cryptographically signed and one or both of (i) registered in the append-only transparency log such that the machine-readable verification profile is retrievable with an inclusion proof, and (ii) anchored to an external timestamping service or immutable ledger, and wherein offline verifying further comprises validating the signature and proving inclusion, anchoring, or both, as applicable, of the machine-readable verification profile before applying the machine-readable verification profile.

18. The method of claim 15, further comprising correlating, in the verification bundle, receipts generated by a plurality of organizations or tenants, including at least one third-party receipt generated by an auditor, a regulator, a customer-side monitor, or an independent measurement system.

19. The method of claim 15, wherein verifying the connector descriptor comprises verifying a signature chain to a trust root, evaluating an attestation measurement or build fingerprint, checking descriptor revocation or validity-window information, evaluating a software bill of materials digest, and enforcing endpoint pinning or sandbox-class constraints.

20. A non-transitory computer-readable medium storing instructions that, when executed by one or more processors, cause an agentic control system to:

receive an action request;

deterministically encode at least a portion of the action request and compute a request digest;

verify an identity credential to obtain a verified identity credential and issue a capability token cryptographically bound to the verified identity credential, the request digest, a least-privilege capability scope, and one or more temporal constraints;

verify a connector descriptor and derive an invocation scope narrower than or equal to the least-privilege capability scope;

execute a connector call to obtain tool output;

enforce a context firewall that blocks direct promotion of the tool output into privileged instruction state absent satisfaction of a verification rule;

generate a plurality of cryptographically linked receipts for at least delegation, invocation, and one or more of promotion, refusal, consumption, or revocation;

register the plurality of cryptographically linked receipts in an append-only transparency log; and output a verification bundle that enables offline reconstruction of lineage for the action request.

21. The non-transitory computer-readable medium of claim 20, wherein the instructions further cause the agentic control system to compute a lineage hash from a receipt digest and one or more parent digests, to suppress duplicates using an idempotency key, and to treat an unknown critical extension as a condition for HOLD or FAIL rather than silent acceptance.

22. The non-transitory computer-readable medium of claim 20, wherein the verification bundle includes at least one privacy-preserving proof mode selected from a Merkle-subtree proof, a cryptographic commitment, a proof of range or rule satisfaction, or an audience-bound pseudonymous subject identifier.

23. The non-transitory computer-readable medium of claim 20, wherein the instructions further cause the agentic control system to output machine-readable reason codes indicating whether offline reconstruction failed because of evidence missing, signature invalidity, token revocation, descriptor untrustworthiness, output-digest mismatch, context-firewall violation, witness-threshold failure, or control-point incompleteness.

* * * * *